United States Patent [19]

Braden-Harder et al.

[11] Patent Number: 5,933,822
[45] Date of Patent: Aug. 3, 1999

[54] APPARATUS AND METHODS FOR AN INFORMATION RETRIEVAL SYSTEM THAT EMPLOYS NATURAL LANGUAGE PROCESSING OF SEARCH RESULTS TO IMPROVE OVERALL PRECISION

[75] Inventors: Lisa Braden-Harder, Reston, Va.; Simon H. Corston, Seattle, Wash.; William B. Dolan, Redmond, Wash.; Lucy H. Vanderwende, Bellevue, Wash.

[73] Assignee: Microsoft Corporation, Redmond, Wash.

[21] Appl. No.: 08/898,652

[22] Filed: Jul. 22, 1997

[51] Int. Cl.[6] .................................................. G06F 17/00
[52] U.S. Cl. ...................................... 707/5; 707/3; 707/4
[58] Field of Search .................. 707/5, 4, 3; 364/419.19; 395/708

[56] References Cited

U.S. PATENT DOCUMENTS

| | | | |
|---|---|---|---|
| 5,278,980 | 1/1994 | Pederson et al. | 707/4 |
| 5,544,049 | 8/1996 | Henderson et al. | 364/419.19 |
| 5,642,502 | 6/1997 | Driscoll | 707/5 |
| 5,671,404 | 9/1997 | Lizee et al. | 707/5 |
| 5,694,592 | 12/1997 | Driscoll | 707/3 |
| 5,706,497 | 1/1998 | Takahashi et al. | 707/5 |
| 5,724,571 | 3/1998 | Woods | 707/5 |
| 5,794,050 | 8/1998 | Dahlgren et al. | 395/708 |
| 5,826,261 | 10/1998 | Spencer | 707/5 |

OTHER PUBLICATIONS

B. Katz, "Annotating the World Wide Web using Natural Language", *Conference Proceedings of RIAO 97*, Computer–Assisted Information Searching in Internet, McGill University, Quebec, Canada, Jun. 25–27 1997, vol. 1, pp. 136–155.

A. T. Arampatzis et al, "IRENA: Information Retrieval Engine based on Natural language Analysis", *Conference Proceedings of RIAO 97*, Computer–Assisted Information Searching in Internet, McGill University, Quebec, Canada, Jun. 25–27, 1997, vol. 1, pp. 159–175.

R. Pohlmann et al, "The Effect of Syntactic Phrase Indexing on Retrieval Performance for Dutch Tests", *Conference Proceedings of RIAO 97*, Computer–Assisted Information Searching in Internet, McGill University, Quebec, Canada, Jun. 25–27, 1997, vol. 1, pp. 176–187.

(List continued on next page.)

*Primary Examiner*—Wayne Amsbury
*Assistant Examiner*—Thuy Pardo
*Attorney, Agent, or Firm*—Michaelson & Wallace; Peter L. Michaelson

[57] ABSTRACT

Apparatus and accompanying methods for an information retrieval system that utilizes natural language processing to process results retrieved by, for example, an information retrieval engine such as a conventional statistical-based search engine, in order to improve overall precision. Specifically, such a search ultimately yields a set of retrieved documents. Each such document is then subjected to natural language processing to produce a set of logical forms. Each such logical form encodes, in a word-relation-word manner, semantic relationships, particularly argument and adjunct structure, between words in a phrase. A user-supplied query is analyzed in the same manner to yield a set of corresponding logical forms therefor. Documents are ranked as a predefined function of the logical forms from the documents and the query. Specifically, the set of logical forms for the query is then compared against a set of logical forms for each of the retrieved documents in order to ascertain a match between any such logical forms in both sets. Each document that has at least one matching logical forms is heuristically scored, with each different relation for a matching logical forms being assigned a different corresponding predefined weight. The score of each such document is, e.g., a predefined function of the weights of its uniquely matching logical forms. Finally, the retained documents are ranked in order of descending score and then presented to a user in that order.

123 Claims, 14 Drawing Sheets

OTHER PUBLICATIONS

M. Mitra et al, "An Analysis of Statistical and Syntactic Phrases", *Conference Proceedings of RIAO 97, Computer–Assisted Information Searching in Internet*, McGill University, Quebec, Canada, Jun. 25–27, 1997, vol. 1, pp. 200–214.

P. Bruza et al, "Query ReFormulation on the Internet: Empirical Data and the Hyperindex Search Engine", *Conference Proceedings of RIAO 97, Computer–Assisted Information Searching in Internet*, McGill University, Quebec, Canada, Jun. 25–27, 1997, vol. 1, pp. 488–499.

G. Grefenstette, "SQLET: Short Query Linguistic Expansion Techniques, Palliating One–Word Queries by Providing Intermediate Structure to Text", *Conference Proceedings of RIAO 97, Computer–Assisted Information Searching in Internet*, McGill University, Quebec, Canada, Jun. 25–27, 1997, vol. 1, pp. 500–509.

R. Chandrasekar et al, "Using Syntactic Information in Document Filtering: A Comparative Study of Part–of–Speech Tagging and Supertagging", *Conference Proceedings of RIAO 97, Computer–Assisted Information Searching in Internet*, McGill University, Quebec, Canada, Jun. 25–27, 1997, vol. 1, pp. 531–545.

M.A. Hearst, "TextTiling: Segmenting Text into Multi–paragraph Subtopic Passages", *Computational Linguistics*, vol. 23, No. 1, 1997, pp. 33–64.

O. Etzoni, "The World–Wide Web: Quagmire or Gold Mine", *Communications of the ACM*, Nov. 1996, vol. 39, No. 11, pp. 65–68.

T. Strzalkowski, "Natural Language Information Retrieval: TIPSTER–2 Final Report", *Proceedings of Advances in Text Processing: Tipster Program Phase* 2, DARPA, May 6–8, 1996, Tysons Corner, Virginia, pp. 143–148.

D. D. Lewis et al, "Natural language Processing for Information Retrieval", *Communications of the ACM*, Jan. 1996, vol. 39, No. 1, pp. 92–101.

T. Strzalkowski, "Natural Language Information Retrieval", *Information Processing and Management*, vol. 31, No. 3, 1995, pp. 397–417.

K. Jensen et al (editors), *Natural Language Processing: The PLNLP Approach* (© 1993, Kluwer Academic Publishers), Chapter 3 "PEG: The PLNLP English Grammar", pp. 29–45 and Chapter 16 "PEGASUS: Deriving Argument Structures after Syntax", pp. 203–214.

J. L. Fagan, "Experiments in Automatic Phrase Indexing for Document Retrieval: A Comparison of Syntactic and Non–Syntactic Methods", Ph.D. Thesis, Cornell University, 1988, pp. i–261.

510 — INPUT STRING: THE OCTOPUS HAS THREE HEARTS.

LOGICAL FORM
TRIPLES:   HAVE — Dsub — OCTOPUS
           HAVE — Dobj — HEART        } 525
           HEART — Ops — THREE

530 — INPUT STRING: THE OCTOPUS HAS THREE HEARTS AND TWO LUNGS.

LOGICAL FORM
TRIPLES:   HAVE  — Dsub — OCTOPUS
           HAVE  — Dobj — HEART
           HAVE  — Dobj — LUNG       } 540
           HEART — Ops  — THREE
           LUNG  — Ops  — TWO

550 — INPUT STRING: THE OCTOPUS HAS THREE HEARTS AND IT CAN SWIM.

LOGICAL FORM GRAPH:

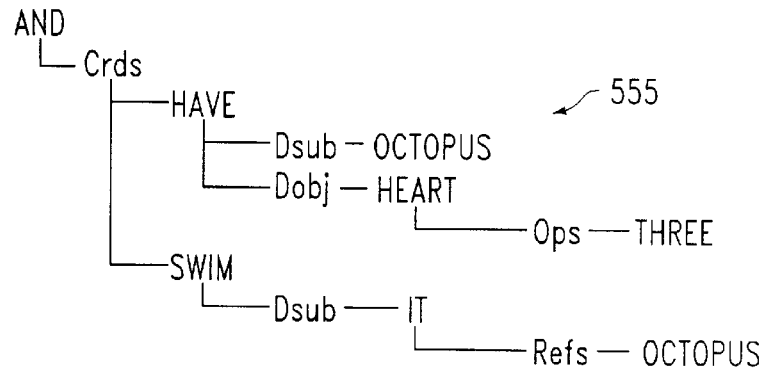

LOGICAL FORM TRIPLES:
HAVE — Dsub — OCTOPUS
HAVE — Dobj — HEART
HEART — Ops — THREE
SWIM — Dsub — IT
SWIM — Dsub — OCTOPUS
} 560

FIG. 5C

570 — INPUT STRING: I LIKE SHARK FIN SOUP BOWLS.

LOGICAL FORM GRAPH:

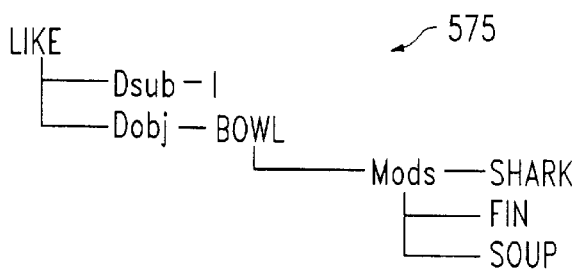

LOGICAL FORM TRIPLES:
LIKE — Dsub — I
LIKE — Dobj — BOWL
BOWL — Mods — SHARK
BOWL — Mods — FIN
BOWL — Mods — SOUP
FIN — Mods — SHARK
SOUP — Mods — SHARK
SOUP — Mods — FIN
} 580

FIG. 5D

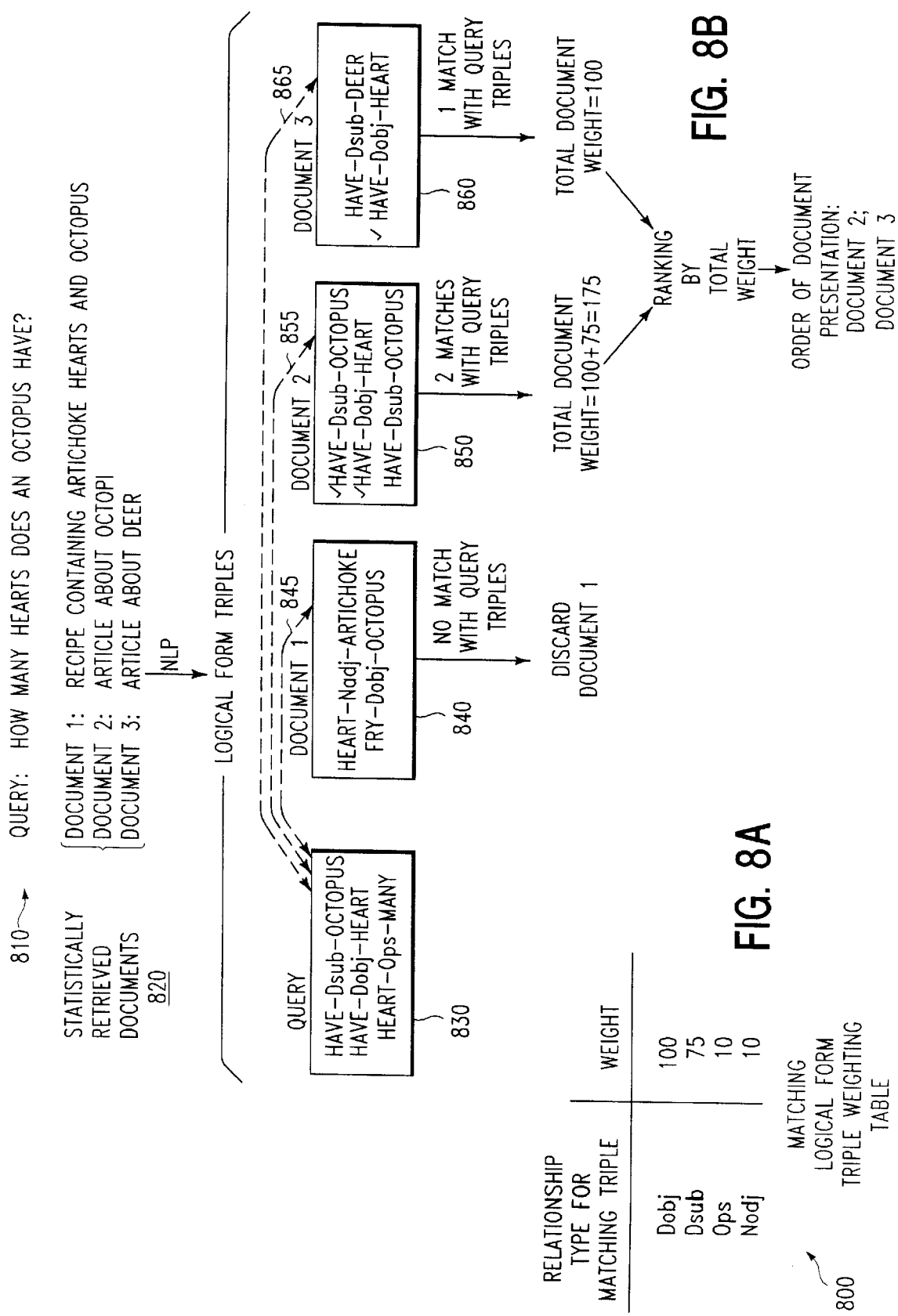

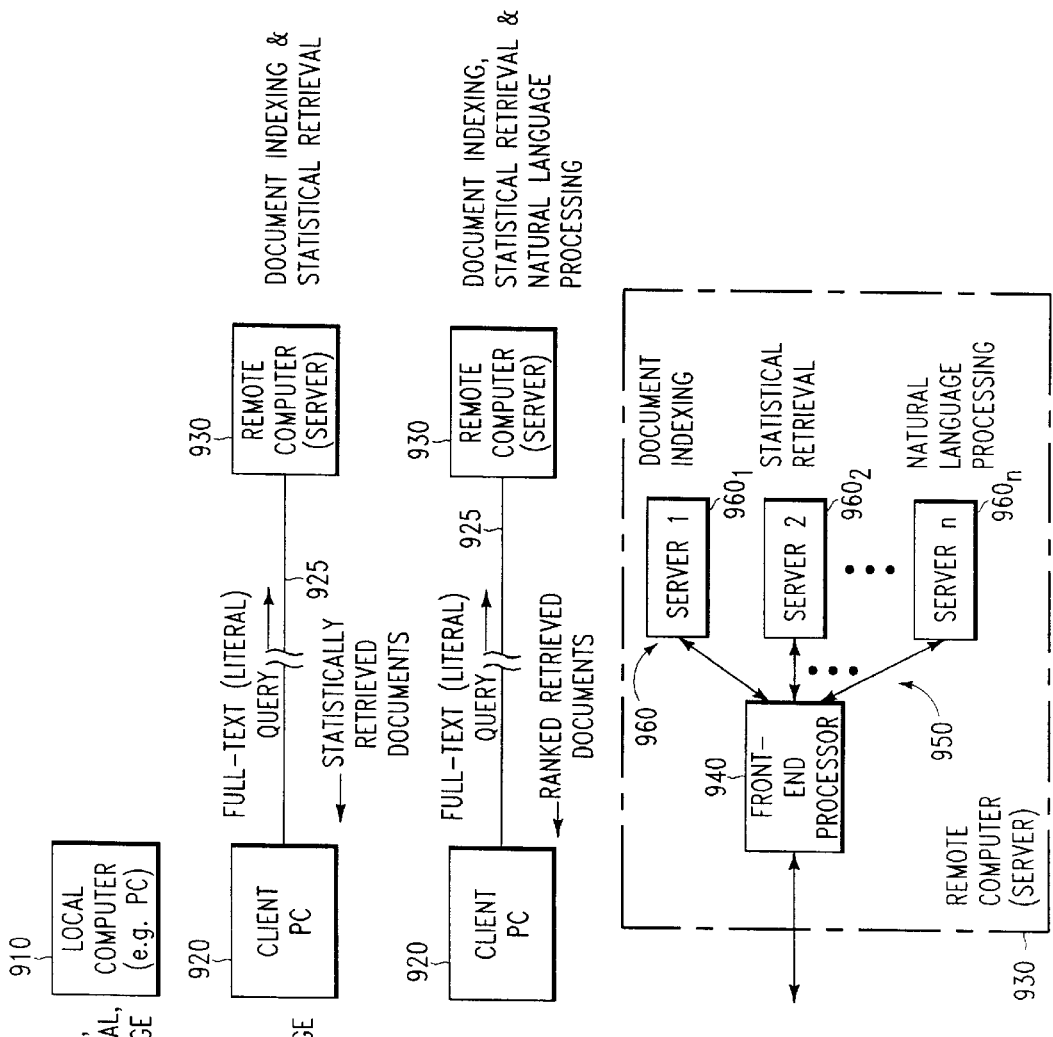

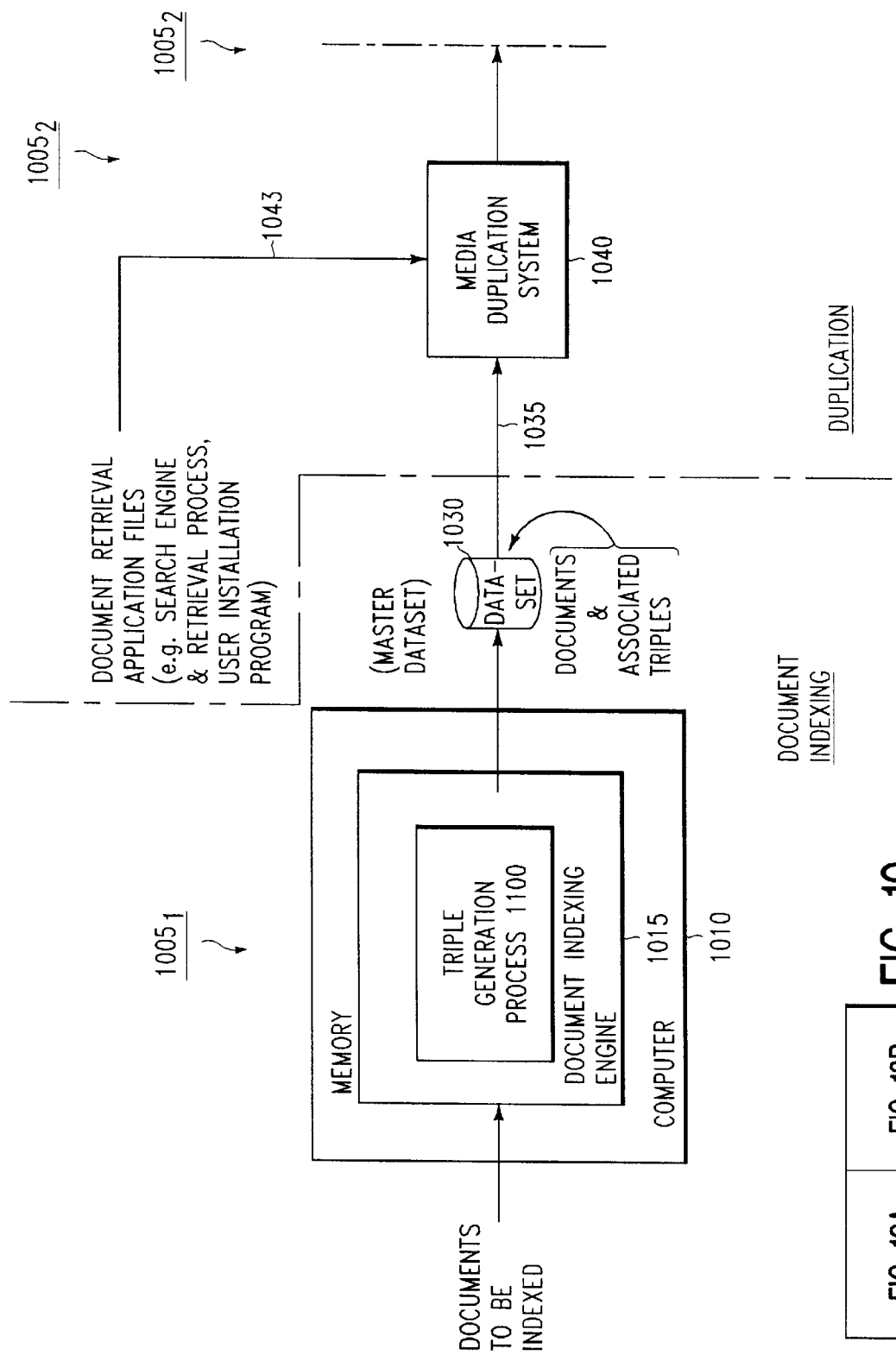

TRIPLE GENERATION PROCESS 1100

RETRIEVAL PROCESS
1200

APPARATUS AND METHODS FOR AN INFORMATION RETRIEVAL SYSTEM THAT EMPLOYS NATURAL LANGUAGE PROCESSING OF SEARCH RESULTS TO IMPROVE OVERALL PRECISION

BACKGROUND OF THE DISCLOSURE

1. Field of the Invention

The invention relates to apparatus and accompanying methods for an information retrieval system that utilizes natural language processing to process results retrieved by, for example, an information retrieval engine such as a conventional statistical-based search engine, in order to improve overall precision.

2. Description of the Prior Art

Starting several decades ago and continuing to the present, automated information retrieval techniques have increasingly been used to retrieve stored information from a mass data store, such as a conventional database containing published materials and/or bibliographic information therefor. Such a conventional database tends to be specialized in that it generally contains information directed to a particular, though broad-based topic, such as electrical engineering and computer related technology, as, e.g., in an INSPEC database maintained by the Institute of Electrical and Electronic engineers (IEEE) and currently accessible through, e.g., Dialog Information Services of Knight-Ridder Information. Inc. (DIALOG is a registered servicemark of Knight-Ridder Information, Inc.). While databases of this type certainly exhibit continuing growth as an increasing number of pertinent articles and other materials are published, the growth tends to be relatively moderate and reasonably well-controlled. Also, such specialized databases tend to be rather well organized.

However, with the advent and proliferation of the so-called "world-wide web" (hereinafter simply referred to as the "web") accessible through the Internet and the relative ease and low-cost associated with posting information to the web and accessing information therefrom as contrasted with traditional publishing, the amount of information available on the web manifests highly exponential, if not explosive, growth, with apparently no realistic limit in sight. While the web offers an increasingly rich array of information across all disciplines of human endeavor, information content on the web is highly chaotic and extremely disorganized, which severely complicates and often frustrates information access and retrieval therefrom.

In an attempt to significantly ease the task of retrieving information from the web, a number of computerized search engines have been developed over the past few years for widespread public use. Generally speaking, these conventional engines, through software-implemented "web crawlers", automatically visit web sites, and trace hypertext links therein, in seriatim and extract, abstract and index each document encountered therein, through so-called "key words", into a large database for subsequent access. Specifically, through such abstraction, each such document encountered by the crawler is reduced to what is commonly called a "bag of words" which contains content-bearing words that exist in the document, though stripped of all semantic and syntactic information. The content words may occur in the document itself and/or in just a description field of a hypertext-markup language (HTML) version of that document. In any event, the engine establishes an entry, i.e., a document record, for each such document. For each document, each of its content words is indexed into a searchable data structure with a link back to the document record. The document record typically contains: (a) a web address, i.e., a URL—uniform resource locator, through which the corresponding document can be accessed by a web browser; (b) various content words in that document, along with, in certain engines, a relative address of each such content word relative to other content words in that document; (c) a short summary, often just a few lines, of the document or a first few lines of that document; and possibly (d) the description of the document as provided in its HTML description field. To search the database, a user supplies the engine with a keyword based query. The query typically contains one or more user-supplied keywords, often just a small number, with, depending on the capabilities of the engine, possibly a Boolean (such as "AND" or "OR") or similar (such as a numeric proximity) operator situated between successive key words. In response to the query, the engine attempts to locate documents that contain as many of the keywords as possible, and, if a logical or proximity operator was provided, those key words in the specific combination requested or within a certain "range" (specified number of content words) of each other. In doing so, the engine searches through its database to locate documents that contain at least one word that matches one of the key words in the query and, where requested, according to the operator and/or range specified therewith. For each such document it finds, the engine retrieves the document record therefor and presents that record to the user ranked according to a number of keyword matches in that document relative to those for the other such documents.

Often, a great majority of documents retrieved solely in response to a user-supplied keyword query would be simply irrelevant to the query, thus frustrating the user.

Consequently, to reduce the number of irrelevant documents that are retrieved, conventional keyword based search engines (hereinafter referred to as simply "statistical search engines") incorporate statistical processing into their search methodologies. For example, based on a total number of matching key words between those in the query and the content words in each retrieved document record and how well these words match, i.e., in the combination and/or within a proximity range requested, a statistical search engine calculates numeric measures, collectively frequently referred to as "statistics", for each such document record retrieved. These statistics may include an inverse document frequency for each matching word. The engine then ranks the document records in terms of their statistics and returns to the user the document records for a small predefined number of retrieved records, typically 5–20 or less, that have the highest rankings. Once the user has reviewed a first group of document records (or, for some engines, the documents themselves if they are returned by the engine) for a first group of retrieved documents, the user can then request a next group of document records having the next highest rankings, and so forth until all the retrieved document records have been so reviewed.

Traditionally, the performance of search engines has been assessed in terms of recall and precision. Recall measures, as a percentage of all relevant documents in a dataset, the number of such documents actually retrieved in response to a given query. Precision, on the other hand, measures, as a percentage of all documents retrieved, the number of those documents that are actually relevant to the query. We believe that in the context of a web search engine, recall is not an important metric of performance, inasmuch as the sheer number of documents ultimately retrieved is unimportant. In fact, for some queries, this number could be inordinately large. Hence, we believe that not all relevant documents indexed by the engine need to be retrieved in order to produce a useful result; however, we believe that precision is extremely important, i.e., the documents that have the highest ranking and are presented first to a user should be those that are the most relevant to the query.

The rather poor precision of conventional statistical search engines stems from their assumption that words are independent variables, i.e., words in any textual passage occur independently of each other. Independence in this context means that a conditional probability of any one word appearing in a document given the presence of another word therein is always zero, i.e., a document simply contains an unstructured collection of words or simply put a "bag of words". As one can readily appreciate, this assumption, with respect to any language, is grossly erroneous. English, like other languages, has a rich and complex syntactic and lexico-semantic structure with words whose meanings vary, often widely, based on the specific linguistic context in which they are used, with the context determining in any one instance a given meaning of a word and what word(s) can subsequently appear. Hence, words that appear in a textual passage are simply not independent of each other, rather they are highly inter-dependent. Keyword based search engines totally ignore this fine-grained linguistic structure. For example, consider an illustrative query expressed in natural language: "How many hearts does an octopus have?" A statistical search engine, operating on content words "hearts" and "octopus", or morphological stems thereof, might likely return or direct a user to a stored document that contains a recipe that has at its ingredients and hence its content words: "artichoke hearts, squid, onions and octopus". This engine, given matches in the two content words "octopus" and "hearts", may determine, based on statistical measures, e.g. including proximity and logical operators, that this document is an excellent match, when, in reality, the document is quite irrelevant to the query.

The art teaches various approaches for extracting elements of syntactic phrases as head-modifier pairs in unlabeled relations. These elements are then indexed as terms (typically without internal structure) in a conventional statistical vector-space model.

One example of such an approach is taught in J. L. Fagan, "Experiments in Automatic Phrase Indexing for Document Retrieval: A Comparison of Syntactic and Non-Syntactic Methods", Ph.D. Thesis, Cornell University, 1988, pages i-261. Specifically, this approach uses natural language processing to analyze English sentences and extract syntactic phrasal constituents elements wherein these phrasal constituents are then treated as terms and indexed in an index using a statistical vector-space model. During retrieval, the user enters a query in natural language which, under this approach, is subjected to natural language processing for analysis and to extract elements of syntactic phrasal constituents analogous to the elements stored in the index. Thereafter, attempts are made to match the elements of the syntactic phrasal constituents from the query to those stored in the index. The author contrasts this purely syntactic approach to a statistical approach, in which a stochastic method is used to identify elements within syntactic phrases. The author concludes that natural language processing does not yield substantial improvements over stochastic approaches, and that the small improvements in precision that natural language processing does sometimes produce do not justify the substantial processing cost associated with natural language processing.

Another such syntactic based-approach is described, in the context of using natural language processing for selecting appropriate terms for inclusion within search queries, in T. Strzalkowski, "Natural Language Information Retrieval: TIPSTER-2 Final Report", *Proceedings of Advances in Text Processing: Tipster Program Phase* 2, DARPA, May 6–8, 1996, Tysons Corner, Va., pages 143–148 (hereinafter the "DARPA paper"); and T. Strzalkowski, "Natural Language Information Retrieval", *Information Processing and Management*, Vol. 31, No. 3, 1995, pages 397–417. While this approach offers theoretical promise, the author on pages 147–8 of the DARPA paper, concludes that, owing to the sophisticated processing required to implement the underlying natural language techniques, this approach is currently impractical:

" . . . [I]t is important to keep in mind that NLP [natural language processing] techniques that meet our performance requirements (or at least are believed to be approaching these requirements) are still fairly unsophisticated in their ability to handle natural language text. In particular, advanced processing involving conceptual structuring, logical forms, etc. is still beyond reach, computationally. It may be assumed that these advanced techniques will prove even more effective, since they address the problem of representation-level limits; however, the experimental evidence is sparse and necessarily limited to rather small scale tests".

A further syntactic-based approach of this sort is described in B. Katz, "Annotating the World Wide Web using Natural Language", *Conference Proceedings of RIAO 97, Computer-Assisted Information Searching in Internet*, McGill University, Quebec, Canada, Jun. 25–27, 1997, Vol. 1, pages 136–155 [hereinafter the "Katz publication"]. As described in the Katz publication, subject-verb-object expressions are created while preserving the internal structure so that during retrieval minor syntactic alternations can be accommodated.

Because these syntactic approaches have yielded lackluster improvements or have not been feasible to implement in natural language processing systems available at the time, the field has moved away from attempting to directly improve the precision and recall of the initial results of query to improvements in the user interface, i.e. specifically through methods for refining the query based on interaction with the user, such as through "find-similar" user responses to a retrieved result, and methods for visualizing the results of a query including displaying results in appropriate clusters.

While these improvements are useful in their own right, the added precision attainable through these improvements is still disappointingly low, and certainly insufficient to drastically reduce user frustration inherent in keyword searching. Specifically, users are still required to manually sift through relatively large sets of documents that are only sparsely populated with relevant responses.

Therefore, a need exists in the art for a technique, specifically apparatus and accompanying methods, for retrieving information that can yield a significant improvement in precision over that attainable through conventional statistical approaches to information retrieval. Moreover, such a technique needs to yield reliable and repeatable results across a wide range of sentence types and lengths in arbitrarily occurring text, and be practical and cost-effective to implement. To significantly improve precision over that of such conventional approaches and in spite of the problems inherent in the art, such a technique should preferably utilize natural language processing to advantageously select relevant documents for retrieval and subsequent user presentation based on matching their semantic content vis-à-vis that of a query.

SUMMARY OF THE INVENTION

In accordance with our broad teachings, the present invention satisfies this need by employing natural language processing to improve the accuracy of a keyword-based document search performed by, e.g., a statistical web search engine.

Broadly speaking, this processing involves production, comparison and weighting of matching logical forms respectively associated with a search query and each of the retrieved documents. The retrieved documents are rank ordered, based on a predefined function of "logical forms" for both the query and the retrieved documents, specifically a sum of weights associated with matching logical forms associated with the documents, and finally displayed in that ordering. A logical form is a directed acyclic graph in which words representing text of any arbitrary size are linked by labeled relations. In particular, a logical form portrays semantic relationships, particularly argument and adjunct relationships, between important words in an input string. This portrayal can take various specific forms, such as, a logical form graph or any sub-graph thereof, the latter including, for example, a list of logical form triples, with each of the triples being illustratively of a form "word-relation-word"; wherein, any one of these forms can be used with our invention.

In accordance with our specific teachings, such a search ultimately yields a set of retrieved documents from, e.g. a database or the world wide web. Each document is then subjected to natural language processing, specifically morphological, syntactic and logical form, to ultimately produce appropriate logical forms for each sentence in each document. A user-supplied query is analyzed in the same manner to yield a set of corresponding logical form triples therefor. The set of logical forms for the query is then compared to the sets of logical forms associated with each of the retrieved documents in order to ascertain a match between logical forms from the query set and logical forms from each document set. Documents that produce no matches are eliminated from further consideration. Each remaining document is then heuristically scored. In particular, each different relation type, i.e., such as deep subject, deep object, operator and the like, that can occur in a logical form is assigned a predefined weight. The score of each such remaining document is a predefined function of the weights of the matching logical forms therein. This function may be, e.g., a sum of the weights associated with all unique matching triples (duplicate matches being ignored) which occur in that document. Finally, the retained documents are then presented to a user in descending rank order based on their scores, typically in groups of a small predefined number of, e.g. five or ten, documents starting with the group having the highest scores, then followed, in descending rank order, by other groups in succession, as the user so selects.

The present invention can be used in several different processing topologies: (a) both the query and keyword based search (document retrieval) can be processed by a common computer, such as a local personal computer (PC); (b) the keyword-based search can be processed by a remote computer, e.g. a remote server, with the query and the search results being processed on, e.g., a client PC; or (c) the query can be generated at a client PC and the remaining processing being distributed throughout various remote servers. In addition, each document in the database can be preprocessed, as it is being indexed into the database, to yield associated logical forms which are then stored for subsequent access, thereby saving execution time whenever that document is subsequently retrieved and subjected to natural language processing.

BRIEF DESCRIPTION OF THE DRAWINGS

The teachings of the present invention can be readily understood by considering the following detailed description in conjunction with the accompanying drawings, in which:

FIGS. 5A–5D depict different corresponding examples of English language sentences of varying complexity and corresponding logical form elements therefor;

FIG. 6 depicts the correct alignment of the drawing sheets for FIGS. 6A and 6B;

FIG. 8A depicts illustrative Matching Logical Form Triple Weighting table 800;

FIG. 8B graphically depicts logical form triple comparison; and document scoring, ranking and selection processes, in accordance with our inventive teachings, that occur within blocks 650, 660, 665 and 670, all shown in FIGS. 6A and 6B, for an illustrative query and an illustrative set of three statistically retrieved documents;

FIGS. 9A–9C respectively depict three different embodiments of information retrieval systems that incorporate the teachings of our present invention;

FIG. 9D depicts an alternate embodiment of remote computer (server) 930 shown in FIG. 9C for use in implementing yet another different embodiment of our present invention;

FIG. 10 depicts the correct alignment of the drawing sheets for FIGS. 10A and 10B;

FIGS. 10A and 10B collectively depict yet another embodiment of our present invention wherein the logical form triples for each document are precomputed and stored, along with the document record therefor, for access during a subsequent document retrieval operation;

FIGS. 12A and 12B collectively depict a flowchart of our inventive Retrieval process 1200 that is executed within computer system 300 shown in FIGS. 10A and 10B;

To facilitate understanding, identical reference numerals have been used, where possible, to designate elements that are common to the figures.

DETAILED DESCRIPTION

After considering the following description, those skilled in the art will clearly realize that the teachings of our present invention can be readily utilized in nearly any information retrieval system to increase the precision of a search engine used therein, regardless of whether that engine is a conventional statistical engine or not. Moreover, our invention can be utilized to improve precision in retrieving textual information from nearly any type of mass data store, e.g. a database whether stored on magnetic, optical (e.g. a CD-ROM) or other media, and regardless of any particular language in which the textual information exists, e.g. English, Spanish, German and so forth.

Generally speaking and in accordance with our present invention, we have recognized that precision of a retrieval engine can be significantly enhanced by employing natural language processing to process, i.e., specifically filter and rank, the records, i.e., ultimately the documents, provided by a search engine used therein.

Figure 1:
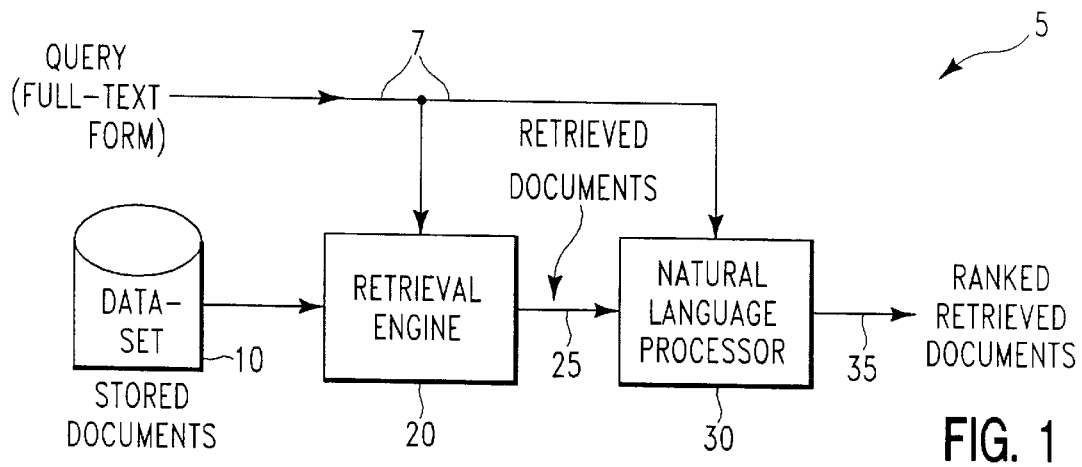
FIG. 1 depicts a very high-level block diagram of information retrieval system 5 in accordance with our present invention.

With this in mind, FIG. 1 depicts a very high-level block diagram of information retrieval system 5 that utilizes our invention. System 5 is formed of conventional retrieval engine 20, e.g. a keyword based statistical retrieval engine, followed by processor 30. Processor 30 utilizes our inventive natural language processing technique, as described below, to filter and re-rank documents produced by engine 20 to yield an ordered set of retrieved documents that are more relevant to a user-supplied query than would otherwise arise.

Specifically, in operation, a user supplies a search query to system 5. The query should be in full-text (commonly referred to as "literal") form in order to take full advantage of its semantic content through natural language processing and thus provide an increase in precision over that associated with engine 20 alone. System 5 applies this query both to engine 20 and processor 30. In response to the query, engine 20 searches through dataset 10 of stored documents to yield a set of retrieved documents therefrom. This set of documents (also referred to herein as an "output document set") is then applied, as symbolized by line 25, as an input to processor 30. Within processor 30, as discussed in detail below, each of the documents in the set is subjected to natural language processing, specifically morphological, syntactic and logical form, to produce logical forms for each sentence in that document. Each such logical form for a sentence encodes semantic relationships, particularly argument and adjunct structure, between words in a linguistic phrase in that sentence. Processor 30 analyzes the query in an identical fashion to yield a set of corresponding logical forms therefor. Processor 30 then compares the set of forms for the query against the sets of logical forms associated with each of the documents in the set in order to ascertain any match between logical forms in the query set and logical forms for each document. Documents that produce no matches are eliminated from further consideration. Each remaining document that contains at least one logical form which matches the query logical form is retained and heuristically scored by processor 30. As will be discussed below, each different relation type, i.e., such as deep subject, deep object, operator and the like, that can occur in a logical form triple is assigned a predefined weight. The total weight (i.e., score) of each such document is, e.g., the sum of the weights of all its uniquely matching triples, i.e. with duplicate matching triples being ignored. Finally, processor 30 presents the retained documents to the user rank-ordered based on their score, typically in groups of a predefined number, e.g. five or ten, starting with those documents that have the highest score.

Inasmuch as system 5 is very general purpose and can be adapted to a wide range of different applications, then, to simplify the following discussion, we will discuss use of our invention in one illustrative context. That context will be an information retrieval system that employs a conventional keyword based statistical Internet search engine to retrieve stored records of English-language documents indexed into a dataset from the world wide web. Each such record generally contains predefined information, as set forth below, for a corresponding document. For other search engines, the record may contain the entire document itself. Though the following discussion addresses our invention in the context of use with a conventional Internet search engine that retrieves a record containing certain information about a corresponding document including a web address at which that document can be found, generically speaking, the ultimate item retrieved by that engine is, in fact, the document, even though an intermediate process, using that address, is generally employed to actually access the document from the web. After considering the following description, those skilled in the art will readily appreciate how our present invention can be easily adapted for use in any other information retrieval application.

Figure 2:
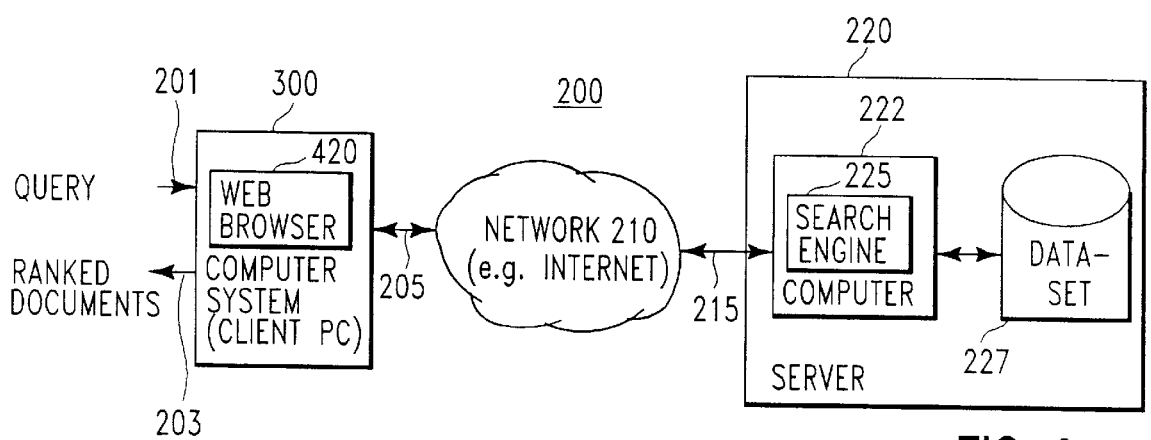
FIG. 2 depicts a high-level embodiment of information retrieval system 200, of the type shown in FIG. 1, that utilizes the teachings of our present invention.

FIG. 2 depicts a high-level block diagram of a particular embodiment of our invention used in the context of an Internet search engine. Our invention will principally be discussed in detail in the context of this particular embodiment. As shown, system 200 contains computer system 300, such as a client personal computer (PC), connected, via network connection 205, through network 210 (here the Internet, though any other such network, e.g. an intranet, could be alternatively used), and network connection 215, to server 220. The server typically contains computer 222 which hosts Internet search engine 225, typified by, e.g., the ALTA VISTA search engine (ALTA VISTA is a registered trademark of Digital Equipment Corporation of Maynard, Mass.) and is connected to mass data store 227, typically a dataset of document records indexed by the search engine and accessible through the World Wide Web on the Internet. Each such record typically contains: (a) a web address (commonly referred to as a uniform resource locator—URL) at which a corresponding document can be accessed by a web browser, (b) predefined content words which appear in that document, along with, in certain engines, a relative address of each such word relative to other content words in that document; (c) a short summary, often just a few lines, of the document or a first few lines of the document; and possibly (d) a description of the document as provided in its hypertext markup language (HTML) description field.

A user stationed at computer system 300 establishes an Internet connection, through, e.g., an associated web browser (such as based on the "Internet Explorer" version 3.0 browser available from the Microsoft Corporation and appropriately modified to include our inventive teachings) executing at this system to server 220 and particularly to search engine 222 executing thereat. Thereafter, the user enters a query, here symbolized by line 201, to the browser which, in turn, sends the query, via system 300 and through the Internet connection to server 220, to search engine 225. The search engine then processes the query against document records stored within dataset 227 to yield a set of retrieved records, for documents, that the engine determines is relevant to the query. Inasmuch as the manner through which engine 225 actually indexes documents to form document records for storage in data store 227 and the actual analysis which the engine undertakes to select any such stored document record are both irrelevant to the present invention, we will not discuss either of these aspects in any further detail. Suffice it to say, that in response to the query, engine 225 returns a set of retrieved document records, via the Internet connection, back to web browser 420. Browser 420, simultaneously while engine 225 is retrieving documents and/or subsequent thereto, analyzes the query to yield its corresponding set of logical form triples. Once the search engine completes its search and has retrieved a set of document records and has supplied that set to the browser, the corresponding documents (i.e., to form an output document set) are themselves accessed by the browser from associated web servers (the datasets associated therewith collectively forming a "repository" of stored documents; such a repository can also be a stand-alone dataset as well, such as in, e.g., a self-contained CD-ROM based data retrieval application). The browser, in turn, then analyzes each of the accessed documents (i.e., in the output document set) to form a corresponding set of logical form triples for each such document. Thereafter, as discussed in detail below, browser 420, based on matching logical form triples between the query and the retrieved documents, scores each document having such a match and presents the user with those documents, as symbolized by line 203, ranked in terms of descending score, typically in a group of a predefined small number of documents having the highest rankings, then followed, if the user so selects through the browser, by the next such group and so forth until the user has examined a sufficient number of the documents so presented. Though FIG. 2 depicts our invention as illustratively utilizing a network connection to obtain document records and documents from a remote server, our invention is not so limited. As will be discussed in detail below, in conjunction with FIG. 9A, such a networked connection is not necessary where the retrieval application and our invention are both executed on a common computer, i.e. a local PC, and an accompanying dataset, e.g. stored in CD-ROM or other suitable media, is situated and accessible thereat.

Figure 3:
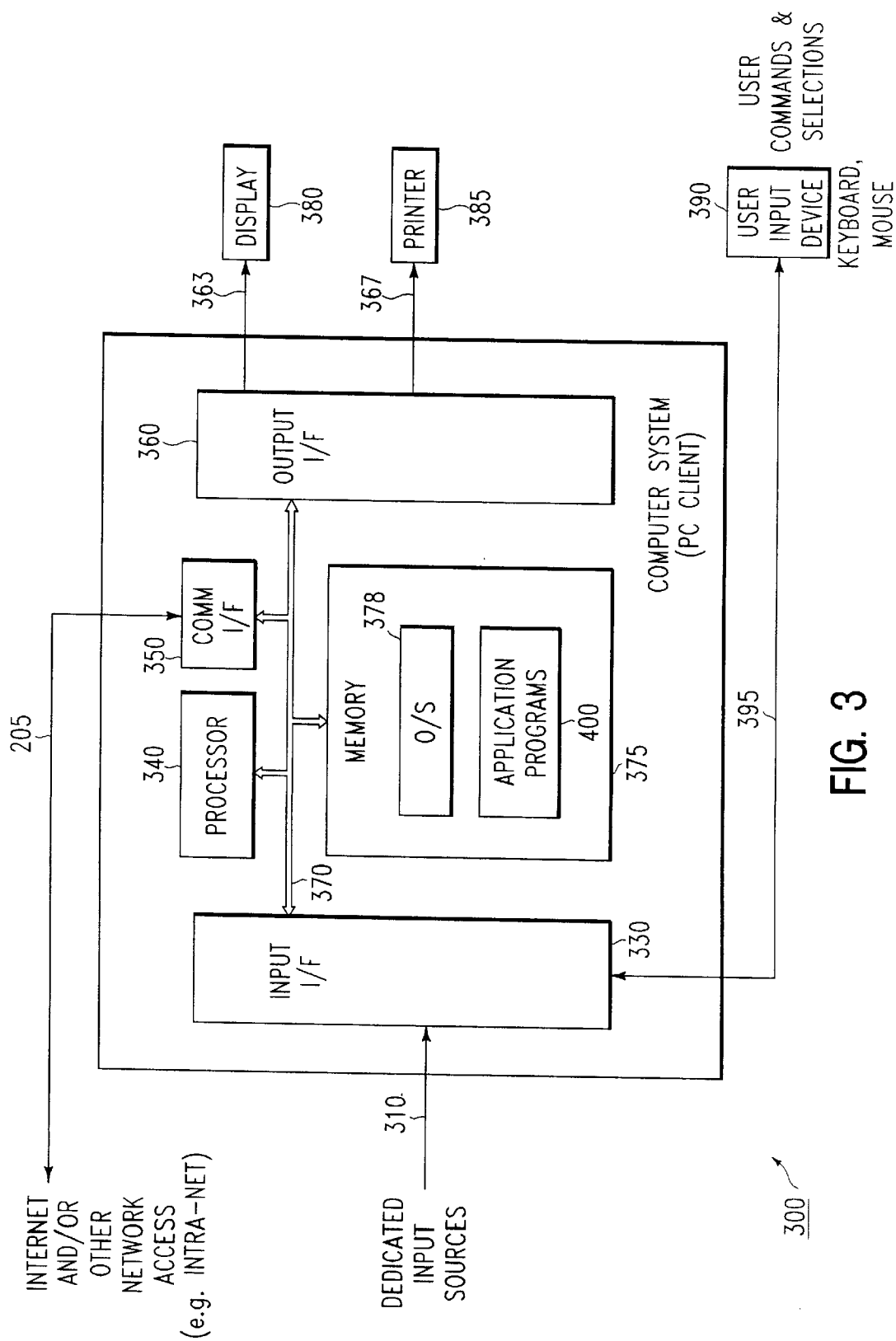
FIG. 3 depicts a block diagram of computer system 300, specifically a client personal computer, that is contained within system 200 shown in FIG. 2.

FIG. 3 depicts a block diagram of computer system 300 shown in FIG. 2, which incorporates the teachings of our present invention.

As shown, this system, illustratively a client personal computer, comprises input interfaces (INPUT I/F) 330, processor 340, communications interface (COMM I/F) 350, memory 375 and output interfaces (OUTPUT I/F) 360, all conventionally interconnected by bus 370. Memory 375, which generally includes different modalities (all of which are not specifically shown for simplicity), illustratively random access memory (RAM) and hard disk storage, stores operating system (O/S) 378 and application programs 400. Software that implements our inventive teachings is typically incorporated within application programs 400, specifically for this embodiment, within a web browser (shown in FIG. 4). This operating system may be implemented by any conventional operating system, such as the WINDOWS NT operating system which is currently available from Microsoft Corporation of Redmond, Wash. (which also owns the registered trademark "WINDOWS NT"). Given that, we will not discuss any components of O/S 378, inasmuch as its constituent processes are irrelevant to the invention. However, the browser, and hence our inventive software, may also be incorporated within the operating system itself. Nevertheless, for the sake of illustration and simplicity, we will assume that the browser is separable from the operating system and is located within application programs 400. Application programs 400 execute under control of O/S 378. For each executing application program including the web browser, one or more separate task instances are invoked by a user in response to each user specified command, typically entered interactively through appropriate manipulation of user input device 390 given available command choices, such as in a menu or icons in a toolbar, and accompanying information then presented on display 380.

As shown in FIG. 3, incoming information can arise from two illustrative external sources: network supplied information, e.g., from the Internet and/or other networked facility such as an intra-net (all generally shown as network 210 in FIG. 2), through network connection 205 to communications interface 350 (shown in FIG. 3), or from a dedicated input source via path(s) 310 to input interfaces 330. Dedicated input can originate from a wide variety of sources, e.g., an external dataset whether local or remote or other input source. Input interfaces 330 are connected to path(s) 310 and contain appropriate circuitry to provide the necessary and corresponding electrical connections required to physically connect and interface each differing dedicated source of input information to computer system 300. Under control of the operating system, application programs 400 exchange commands and data with external sources, such as a remote web server, via network connection 205 or dedicated sources via path(s) 310, to transmit and receive information typically requested by a user during program execution.

Input interfaces 330 can also electrically connect, via leads 395, and interface user input device 390, such as a keyboard and mouse, to computer system 300. Display 380, such as a conventional color monitor, and printer 385, such as a conventional laser printer, can be connected, via leads 363 and 367, respectively, to output interfaces 360. The output interfaces provide requisite circuitry to electrically connect and interface the display and printer to the computer system. Hardcopy output information from an executing application is provided to the user through printer 385. In particular, through the display and printer and appropriate manipulation of input devices 390 (specifically the mouse and keyboard), a user stationed at system 300 can, e.g., graphically communicate, via the Internet, with any of a vast number of remote web servers, including a search engine(s) accessible therethrough, and download information, such as documents, therefrom for local display and printing.

Since the specific hardware components of computer system 300 as well as all aspects of the software stored within memory 375, apart from those necessary to implement the present invention, are conventional and well-known, they will not be discussed in any further detail.

Figure 4:
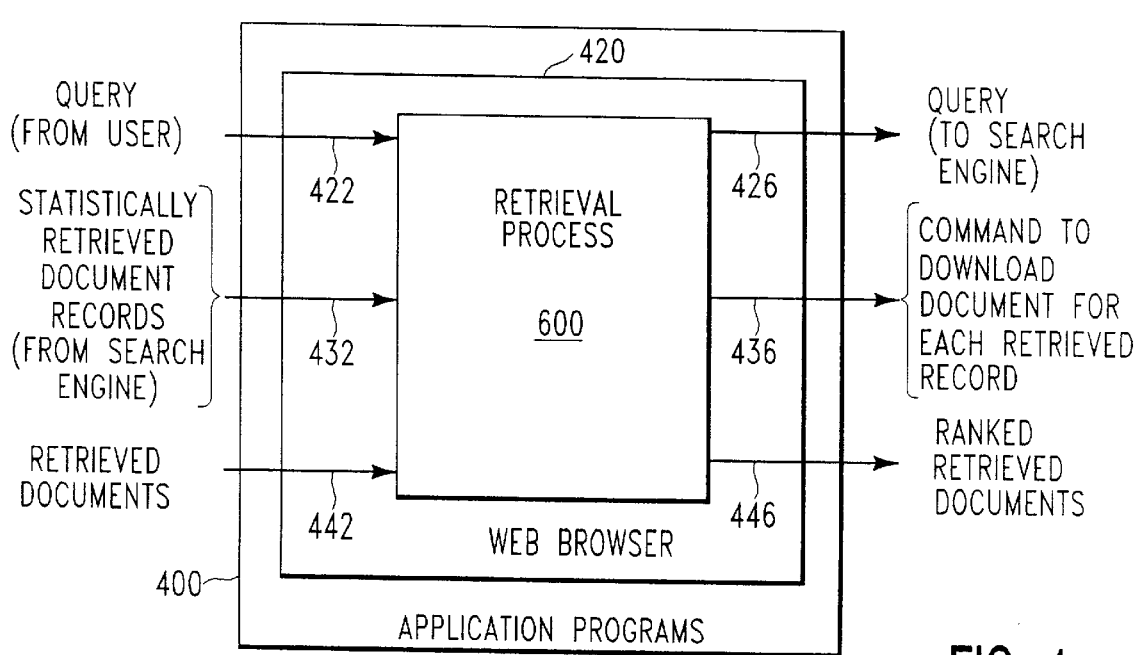
FIG. 4 depicts a very-high level block diagram of application programs 400 that execute within computer 300 shown in FIG. 3.

FIG. 4 depicts a very-high level block diagram of application programs 400 that execute within computer 300 shown in FIG. 3. These programs, to the extent relevant to the present invention, include, as shown in FIG. 4, web browser 420 which, for implementing our present invention, comprises retrieval process 600 (which will be discussed below in detail in conjunction with FIGS. 6A and 6B). Assuming an Internet connection is established between the web browser and, e.g., a user-selected statistical search engine, such as the ALTA VISTA search engine, the user then supplies, as symbolized by line 422 shown in FIG. 4, process 600 with a full-text ("literal") search query. This process forwards, as symbolized by line 426, the query through the web browser to the search engine. In addition, though not specifically shown, process 600 also internally analyzes the query to produce its corresponding logical form triples which are then locally stored within computer 300. In response to the query, the search engine supplies, as symbolized by line 432, process 600 with a set of statistically retrieved document records. Each of these records includes, as noted above, a web address, specifically a URL, at which that document can be accessed and appropriate command(s) required by a remote web server, at which that document resides, sufficient to download, over the Internet, a computer file containing that document. Once process 600 receives all the records, this process then sends, via web browser 420 and as symbolized by line 436, the appropriate commands to access and download all the documents specified by the records (i.e., to form the output document set). These documents are then accessed, in seriatim, from their corresponding web servers and downloaded to web browser 420 and specifically process 600, as symbolized by line 442. Once these documents are downloaded, process 600 analyzes each such document to produce and locally store the corresponding logical form triples therefor. Thereafter, through comparing the logical form triples for the query against those for each document, process 600 scores each document that contains at least one matching logical form triple, then ranks these particular documents based on their scores, and finally instructs web browser 400 to present these particular documents, as symbolized by line 446, in ranked order by descending document score on a group-by-group basis to the user. Browser 400 generates a suitable selection button, on a screen of display 380 (see FIG. 3), through which the user can select, by appropriately "clicking" thereon with his(her) mouse, to display each successive group of documents, as desired.

To fully appreciate the utility of logical forms in determining, preserving and encoding semantic information, at this point, we will digress from discussing the processing that implements our invention to illustrate and describe, to the extent relevant, logical form and logical form triples as used in the present invention and provide a brief overview of the manner through which they are produced.

Broadly speaking, a logical form is a directed acyclic graph in which words representing text of any arbitrary size are linked by labeled relations. A logical form portrays semantic relationships between important words in a phrase, which may include hypernyms and/or synonyms thereof. As will be discussed and illustrated in FIGS. 5A–5D, a logical form can take on any one of a number of different forms, e.g. a logical form graph or any sub-graph thereof such as, for example, a list of logical form triples, each of the triples being illustratively of a form "word-relation-word". While our present invention, as specifically embodied, generates and compares logical form triples, our invention can readily utilize any other form, such as those noted above, that can portray a semantic relationship between words.

Figure 5A:
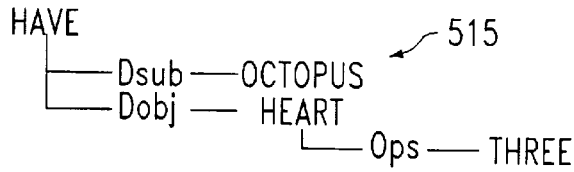

Since logical form triples and their construction can best be understood through a series of examples of increasingly complex sentences, first consider FIG. 5A. This figure depicts logical form graph 515 and logical form triples 525 for illustrative input string 510, specifically a sentence "The octopus has three hearts.".

In general, to generate logical form triples for an illustrative input string, e.g. for input string 510, that string is first parsed into its constituent words. Thereafter, using a predefined record (not to be confused with document records employed by a search engine), in a stored lexicon, for each such word, the corresponding records for these constituent words, through predefined grammatical rules, are themselves combined into larger structures or analyses which are then, in turn, combined, again through predefined grammatical rules, to form even larger structures, such as a syntactic parse tree. A logical form graph is then built from the parse tree. Whether a particular rule will be applicable to a particular set of constituents is governed, in part, by presence or absence of certain corresponding attributes and their values in the word records. The logical form graph is then converted into a series of logical form triples. Illustratively, our invention uses such a lexicon having approximately 165,000 head word entries. This lexicon includes various classes of words, such as, e.g., prepositions, conjunctions, verbs, nouns, operators and quantifiers that define syntactic and semantic properties inherent in the words in an input string so that a parse tree can be constructed therefor. Clearly, a logical form (or, for that matter, any other representation, such as logical form triples or logical form graph within a logical form, capable of portraying a semantic relationship) can be precomputed, while a corresponding document is being indexed, and stored, within, e.g., a record for that document, for subsequent access and use rather than being computed later once that document has been retrieved. Using such precomputation and storage, as occurs in another embodiment of our invention discussed in detail below in conjunction with FIGS. 10–13B, drastically and advantageously reduces the amount of natural language processing, and hence execution time associated therewith, required to handle any retrieved document in accordance with our invention.

In particular, an input string, such as sentence 510 shown in FIG. 5A, is first morphologically analyzed, using the predefined record in the lexicon for each of its constituent words, to generate a so-called "stem" (or "base") form therefor. Stem forms are used in order to normalize differing word forms, e.g., verb tense and singular-plural noun variations, to a common morphological form for use by a parser. Once the stem forms are produced, the input string is syntactically analyzed by the parser, using the grammatical rules and attributes in the records of the constituent words, to yield the syntactic parse tree therefor. This tree depicts the structure of the input string, specifically each word or phrase, e.g. noun phrase "The octopus", in the input string, a category of its corresponding grammatical function, e.g., NP for noun phrase, and link(s) to each syntactically related word or phrase therein. For illustrative sentence 510, its associated syntactic parse tree would be:

TABLE 1

SYNTACTIC PARSE TREE
for "The octopus has three hearts."

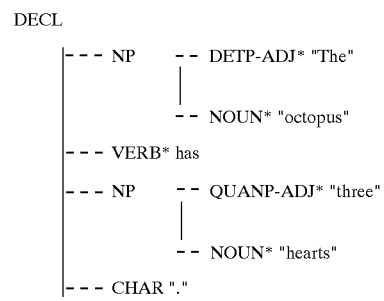

A start node located in the upper-left hand corner of the tree defines the type of input string being parsed. Sentence types include "DECL" (as here) for a declarative sentence, "IMPR" for an imperative sentence and "QUES" for a question. Displayed vertically to the right and below the start node is a first level analysis. This analysis has a head node indicated by an asterisk, typically a main verb (here the word "has"), a premodifier (here the noun phrase "The octopus"), followed by a postmodifier (the noun phrase "three hearts"). Each leaf of the tree contains a lexical term or a punctuation mark. Here, as labels, "NP" designates a noun phrase, and "CHAR" denotes a punctuation mark.

The syntactic parse tree is then further processed using a different set of rules to yield a logical form graph, such as graph 515 for input string 510. The process of producing a logical form graph involves extracting underlying structure from syntactic analysis of the input string; the logical form graph includes those words that are defined as having a semantic relationship therebetween and the functional nature of the relationship. The "deep" cases or functional roles used to categorize different semantic relationships include:

TABLE 2

| | |
|---|---|
| Dsub | deep subject |
| Dind | deep indirect object |
| Dobj | deep object |
| Dnom | deep predicate nominative |
| Dcmp | deep object complement. |

To identify all the semantic relationships in an input string, each node in the syntactic parse tree for that string is examined. In addition to the above relationships, other semantic roles are used, e.g. as follows:

TABLE 3

| | |
|---|---|
| PRED | predicate |
| PTCL | particle in two-part verbs |
| Ops | Operator, e.g. numerals |
| Nadj | adjective modifying a noun |
| Dadj | predicate adjective |
| PROPS | otherwise unspecified modifier that is a clause |
| MODS | otherwise unspecified modifier that is not a clause |

Additional semantic labels are defined as well, for example:

TABLE 4

| | |
|---|---|
| TmeAt | time at which |
| LocAt | location |

In any event, the results of such analysis for input string 510 is logical form graph 515. Those words in the input string that exhibit a semantic relationship therebetween (such as, e.g. "Octopus" and "Have") are shown linked to each other with the relationship therebetween being specified as a linking attribute (e.g. Dsub). This graph, typified by graph 515 for input string 510, captures the structure of arguments and adjuncts for each input string. Among other things, logical form analysis maps function words, such as prepositions and articles, into features or structural relationships depicted in the graph. Logical form analysis also resolves anaphora, i.e., defining a correct antecedent relationship between, e.g., a pronoun and a co-referential noun phrase; and detects and depicts proper functional relationships for ellipsis. Additional processing may well occur during logical form analysis in an attempt to cope with ambiguity and/or other linguistic idiosyncrasies. Corresponding logical form triples are then simply read in a conventional manner from the logical form graph and stored as a set. Each triple contains two node words as depicted in the graph linked by a semantic relationship therebetween. For illustrative input string 510, logical form triples 525 result from processing graph 515. Here, logical form triples 525 contain three individual triples that collectively convey the semantic information inherent in input string 510.

Figure 5B:
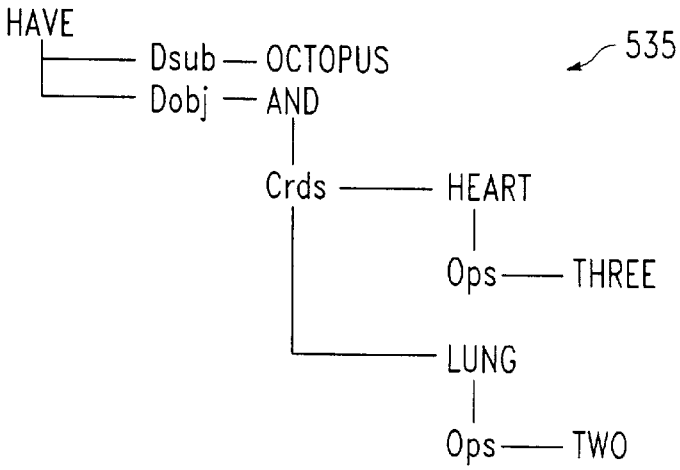

Similarly, as shown in FIGS. 5B–5D, for input strings 530, 550 and 570, specifically exemplary sentences "The octopus has three hearts and two lungs.", "The octopus has three hearts and it can swim.", and "I like shark fin soup bowls.", logical form graphs 535, 555 and 575, as well as logical form triples 540, 560 and 580, respectively result.

There are three logical form constructions for which additional natural language processing is required to correctly yield all the logical form triples, apart from the conventional manner, including a conventional "graph walk", in which logical form triples are created from the logical form graph. In the case of coordination, as in exemplary sentence "The octopus has three hearts and two lungs", i.e. input string 530, a logical form triple is created for a word, its semantic relation, and each of the values of the coordinated constituent. According to a "special" graph walk, we find in FIG. 540 two logical form triples "have-Dobj-heart" and "have-Dobj-lung". Using only a conventional graph walk, we would have obtained only one logical form triple "have-Dobj-and". Similarly, in the case of a constituent which has referents (Refs), as in exemplary sentence "The octopus has three hearts and it can swim", i.e. input string 550, we create a logical form triple for a word, its semantic relation, and each of the values of the Refs attribute, in additional to the triples generated by the conventional graph walk. According to this special graph walk, we find in triples 560 the logical form triple "swim-Dsub-octopus" in addition to the conventional logical form triple "swim-Dsub-it". Finally, in the case of a constituent with noun modifiers, as in the exemplary sentence "I like shark fin soup bowls", i.e. input string 570, additional logical form triples are created to represent possible internal structure of the noun compounds. The conventional graph walk created the logical form triples "bowl-Mods-shark", "bowl-Mods-fin" and "bowl-Mods-soup", reflecting the possible internal structure [[shark] [fin] [soup] bowl]. In the special graph walk, we create additional logical form triples to reflect the following possible internal structures [[shark fin] [soup] bowl] and [[shark] [fin soup] bowl] and [[shark [fin] soup] bowl], respectively: "fin-Mods-shark", "soup-Mods-fin", and "soup-Mods-shark".

Inasmuch as the specific details of the morphological, syntactic, and logical form processing are not relevant to the present invention, we will omit any further details thereof. However, for further details in this regard, the reader is referred to co-pending United States patent applications entitled "Method and System for Computing Semantic Logical Forms from Syntax Trees", filed Jun. 28, 1996 and assigned Ser. No. 08/674,610 and particularly "Information Retrieval Utilizing Semantic Representation of Text", filed Mar. 7, 1997 and assigned Ser. No. 08/886,814; both of which have been assigned to the present assignee hereof and are incorporated by reference herein.

With this overview of logical forms and their construction in mind, we will now return to discussing the processing that implements our present invention.

Figure 6A:
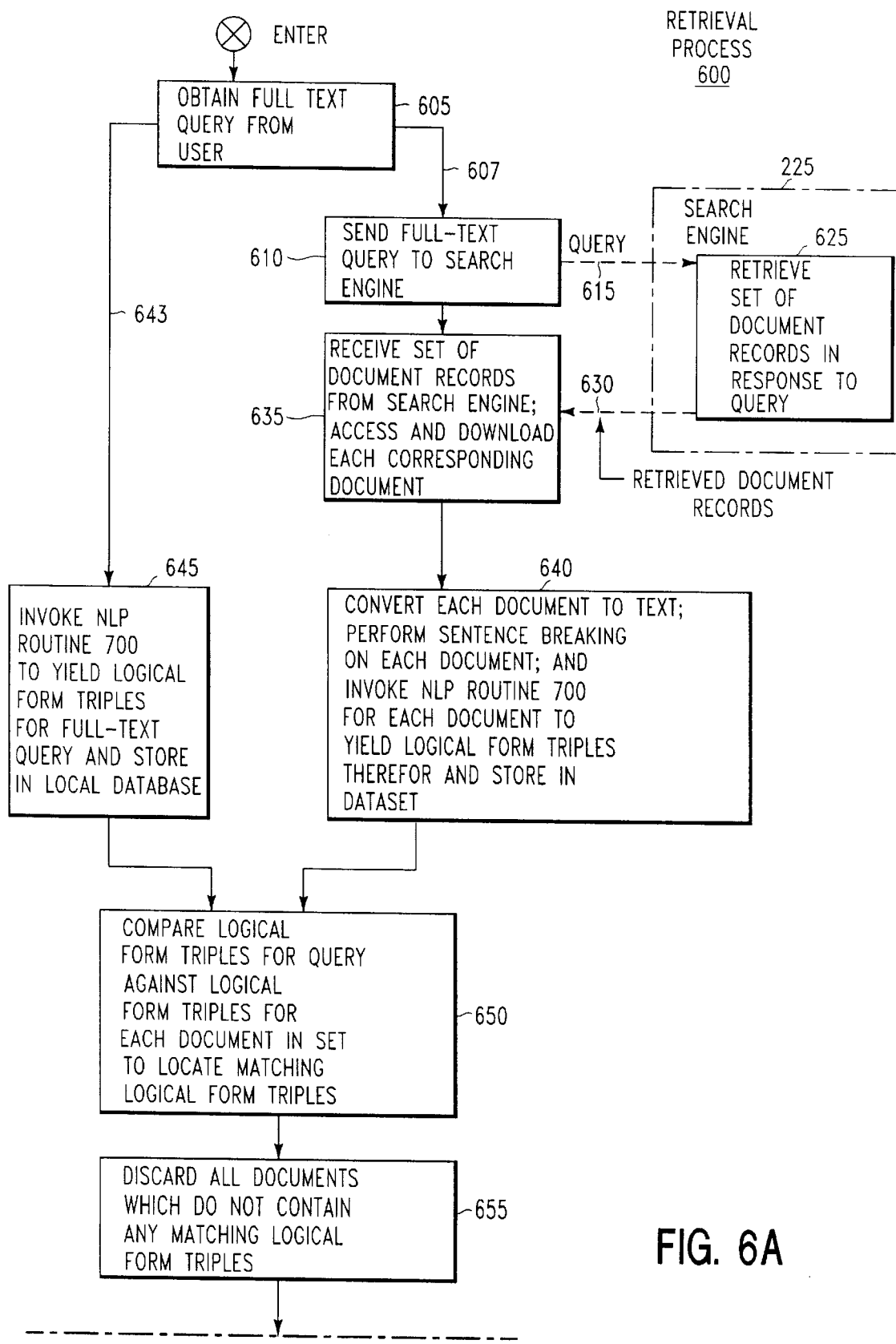
FIGS. 6A and 6B collectively depict a flowchart of our inventive Retrieval process 600.
Figure 6B:
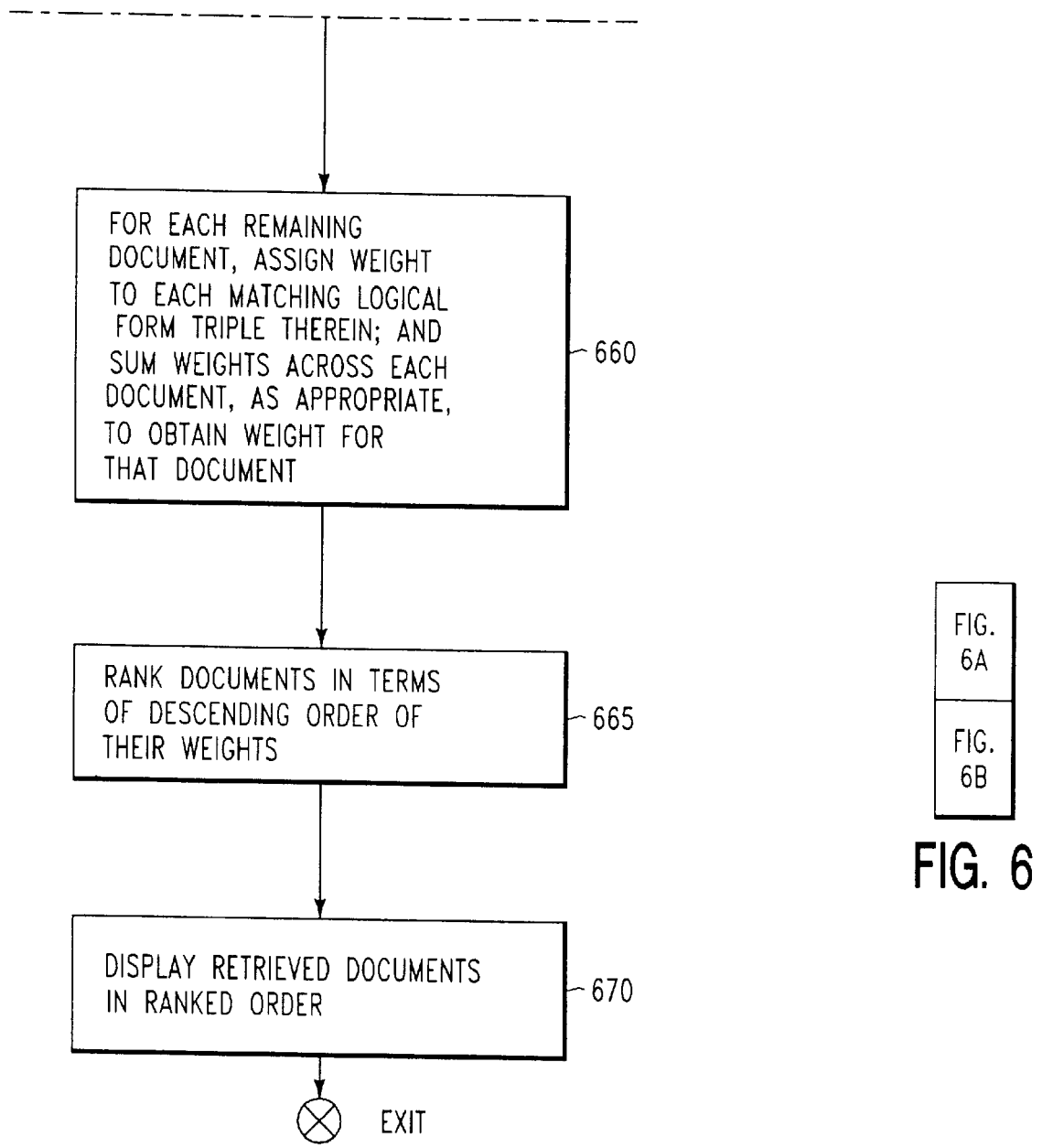

A flowchart of our inventive retrieval process 600, as used in the specific embodiment of our invention shown in FIGS. 2, 3 and 4, is collectively depicted in FIGS. 6A and 6B; for which the correct alignment of the drawing sheets for these figures is shown in FIG. 6. With exception of the operations shown in dashed block 225, the remaining operations shown in these figures are performed by computer system, e.g. client PC 300 (see FIGS. 2 and 3) and specifically within web browser 420. To simplify understanding, the reader should simultaneously refer to FIGS. 2, 3 and 6A–6B throughout the following discussion.

Upon entry into process 600, execution proceeds first to block 605. This block, when executed, prompts a user to enter a full-text (literal) query through web browser 420. The query can be in the form of a single question (e.g. "Are there any air-conditioned hotels in Bali?") or a single sentence (e.g. "Give me contact information for all fireworks held in Seattle during the month of July.") or a sentence fragment (e.g. "Clothes in Ecuador"). Once this query is obtained, execution splits and proceeds, via path 607, to block 610 and, via path 643, to path 645. Block 645, when performed, invokes NLP routine 700 to analyze the query and construct and locally store its corresponding set of logical form triples. Block 610, when performed, transmits, as symbolized by dashed line 615, the full-text query from web browser 420, through an Internet connection, to a remote search engine, such as engine 225 situated on server 220. At this point, block 625 is performed by the search engine to retrieve a set of document records in response to the query. Once this set is formed, the set is transmitted, as symbolized by dashed line 630, by the remote server back to computer system 300 and specifically to web browser 420 executing thereat. Thereafter, block 635 is performed to receive the set of records, and then for each record: extract a URL from that record, access a web site at that URL and download therefrom an associated file containing a document corresponding to that record. Once all the documents have been downloaded, block 640 is performed. For each such document, this block first extracts all the text from that document, including any text situated within HTML tags associated with that document. Thereafter, to facilitate natural language processing which operates on a single sentence at a time, the text for each document is broken into a text file, through a conventional sentence breaker, in which each sentence (or question) occupies a separate line in the file. Thereafter, block 640 repeatedly invokes NLP routine 700 (which will be discussed in detail below in conjunction with FIG. 7), for each line of text in that document, to analyze each of these documents and construct and locally store a corresponding set of logical form triples for each line of text in that document. Though the operations in block 645 have been discussed as being performed essentially in parallel with those in blocks 610, 635 and 640, the operations in the former block, based on actual implementation considerations, could be performed serially either before or after the operations in blocks 610, 635 and 640. Alternatively, as in the case of another embodiment of our invention as discussed below in conjunction with FIGS. 10–13B, the logical form triples for each document can be precomputed and stored for subsequent access and use during document retrieval, in which case, these triples would simply be accessed rather than computed during document retrieval. In this case, the triples may have been stored, in some manner, as properties of that stored document or as, e.g., a separate entry in either the record for that document or in the dataset containing that document.

In any event and returning to process 600 shown in FIGS. 6A and 6B, once the sets of logical form triples have been constructed and fully stored for both the query and for each of the retrieved documents in the output document set, block 650 is performed. This block compares each of the logical form triples in the query against each of the logical form triples for each of the retrieved documents to locate a match between any triple in the query and any triple in any of the documents. An illustrative form of matching is defined as an identical match between two triples both in terms of the node words as well as in the relation type in these triples. In particular, for an illustrative pair of logical form triples: word1a-relation1-word2a and word1b-relation2-word2b, a match only occurs if the node words word1a and word 1b are identical to each other, node words word2a and word2b are identical to each other, and relation1 and relation2 are the same. Unless all three elements of one triple identically match corresponding elements of another triple, these two triples do not match. Once block 650 completes, block 655 is performed to discard all retrieved documents that do not exhibit a matching triple, i.e., having no triple that matches any triple in the query. Thereafter, block 660 is performed. Through block 660, all remaining documents are assigned a score, based on the relation type(s) of matching triples and their weights, that exist for each of those documents. In particular, each different type of relation that can arise in a logical form triple is assigned a corresponding weight, such as those shown in table 800 in FIG. 8A. For example, as shown, illustrative relations Dobj, Dsub, Ops and Nadj may be assigned predetermined static numeric weights of 100, 75, 10 and 10, respectively. The weight reflects a relative importance ascribed to that relation in indicating a correct semantic match between a query and a document. The actual numeric values of these weights are generally defined on an empirical basis. As described in detail in conjunction with FIG. 8B below, for each remaining document, its score is a predefined function, illustratively here a numeric sum, of the weights of its unique matching triples (ignoring all duplicate matching triples). Once the documents are so weighted, block 665 is performed to rank order the documents in order of descending score. Finally, block 670 is performed to display the documents in rank order, typically in terms of a small predefined group of documents, typically five or ten, that exhibit the highest scores. Thereafter, the user, can by, for example, appropriately "clicking" his(her) mouse on a corresponding button displayed by web browser 420, have computer system (client PC) 300 display the next group of ranked documents, and so forth until the user has sufficiently examined all the ranked documents in succession, at which point process 600 is completed.

Figure 7:
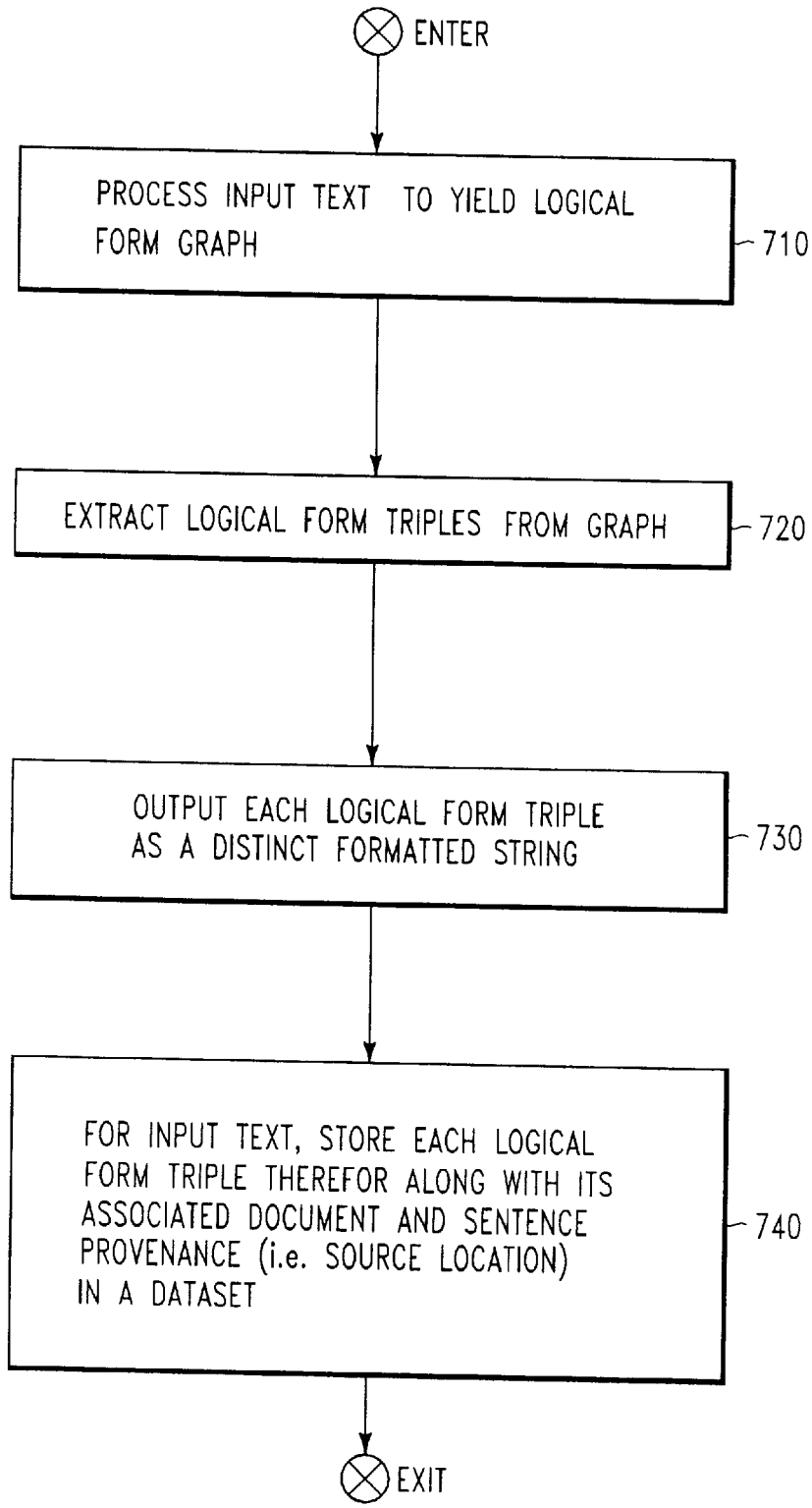
FIG. 7 depicts a flowchart of NLP routine 700 that is executed within process 600.

FIG. 7 depicts a flowchart of NLP routine 700. This routine, given a single line of input text—whether it be a query, sentence in a document, or text fragment, constructs the corresponding logical form triples therefor.

In particular, upon entry into routine 700, block 710 is first executed to process a line of input text to yield a logical form graph, such as illustrative graph 515 shown in FIG. 5A. This processing includes morphological and syntactic processing to yield a syntactic parse tree from which a logical form graph is then computed. Thereafter, as shown in FIG. 7, block 720 is performed to extract (read) a set of corresponding logical form triples from the graph. Once this occurs, block 730 is executed to generate each such logical form triple as a separate and distinct formatted text string. Finally, block 740 is executed to store, in a dataset (or database), the line of input text and, as a series of formatted text strings, the set of logical form triples for that line. Once this set has been completely stored, execution exits from block 700. Alternatively, if in lieu of logical form triples, a different representation, e.g. a logical form graph, associated with a logical form is to be used in conjunction with our invention, then blocks 720 and 730 would be readily modified to generate that particular form as the formatted string, with block 740 storing that form in lieu of logical form triples into the dataset.

To fully appreciate the manner through which our invention compares and weights matching logical form triples, and ranks corresponding documents, consider FIG. 8B. This figure graphically depicts logical form triple comparison; document scoring, ranking and selection processes, in accordance with our inventive teachings, that occur within blocks 650, 660, 665 and 670, all shown in FIGS. 6A and 6B, for an illustrative query and an illustrative set of three retrieved documents. Assume for purposes of illustration, that a user supplied full-text query 810 to our inventive retrieval system, with the query being "How many hearts does an octopus have?". Also, assume that, in response to this query, through a statistical search engine, three documents 820 were ultimately retrieved. Of these documents, a first document (denoted Document 1) is a recipe containing artichoke hearts and octopus. A second document (denoted Document 2) is an article about octopi. A third document (denoted Document 3) is an article about deer. These three documents and the query are converted into their constituent logical form triples, the process therefor being generically represented by "NLP" (natural language processing). The resulting logical form triples for the query and Document 1, Document 2 and Document 3 are given in blocks 830, 840, 850 and 860, respectively.

Once these triples have been so defined, then as symbolized by dashed lines 845, 855 and 865, the logical form triples for the query are compared, in seriatim, against the logical form triples for Document 1, Document 2 and Document 3, respectively, to ascertain whether any document contains any triple that matches any logical form triple in the query. Those documents that contain no such matching triples, as in the case of Document 1, are discarded and hence considered no further. Document 2 and Document 3, on the other hand, contain matching triples. In particular, Document 2 contains three such triples: "HAVE-Dsub-OCTOPUS", "HAVE-Dsub-HEART" illustratively associated with one sentence, and "IHAVE-Dsub-OCTOPUS" associated illustratively with another sentence (these sentences not specifically shown). Of these triples, two are identical, i.e., "HAVE-Dsub-OCTOPUS". A score for a document is illustratively a numeric sum of the weights of all uniquely matching triples in that document. All duplicate matching triples for any document are ignored. An illustrative ranking of the relative weightings of the different types of relations that can occur in a triple, in descending order from their largest to smallest weightings are: first, verb-object combinations (Dobj); verb-subject combinations (Dsub); prepositions and operators (e.g. Ops), and finally modifiers (e.g. Nadj). Such a weighting scheme is given in illustrative triple weighting table 800 shown in FIG. 8A. To simplify this figure, table 800 does not include all the different relations that can arise in a logical form triple, but rather just those pertinent for the triples shown in FIG. 8B. With this metric, the particular triples in each document that contribute to its score are indicated by a check ("✓") mark. Of course, other predefined metrics for scoring documents may be used than those we have chosen, such as, e.g., multiplying rather than adding weights in order to provide enhanced document selectivity (discrimination), or summing the weights in a different predefined fashion, such as including multiple matches of the same type and/or excluding the weights of other triples than those noted above. In addition, for any document, the score may also take into account, in some fashion: the node words in the triples themselves in that document, or the frequency or semantic content of these node words in that document; the frequency or semantic content of specific node words in that document; or the frequency of specific logical forms (or paraphrases thereof) and/or of particular logical form triples as a whole in that document; as well as the length of that document.

Thus, given the scoring metric we have chosen and the weights listed in table 800 in FIG. 8A, the score for Document 2 is 175 and is formed by combining the weights, i.e., 100 and 75, for the first two triples associated with the first sentence in the document and indicated in block 850. The third triple in this document and associated with the second sentence thereof, and listed in this block, which already matches one of other triples existing in the document is ignored. Similarly, the score for Document 3 is 100 and is formed of the weight, here 100, for the sole matching triple, as listed in block 860, in this particular document. Based on the scores, Document 2 is ranked ahead of Document 3 with these documents being presented to the user in that order. In the event, which has not occurred here, that any two documents have the same score, then those documents are ranked in the same order provided by the conventional statistical search engine and are presented to the user in that order.

Clearly, those skilled in the art will readily appreciate that various portions of the processing used to implement our present invention can reside in a single computer or be distributed among different computers that collectively form an information retrieval system. In that regard, FIGS. 9A–9C respectively depict three different embodiments of information retrieval systems that incorporate the teachings of our present invention.

One such alternate embodiment is shown in FIG. 9A wherein all the processing resides in single local computer 910, such as a PC. In this case, computer 910 hosts a search engine and, through that engine, indexes input documents and searches a dataset (either locally situated thereat, such as on a CD-ROM or other storage medium, or accessible to that computer), in response to a user-supplied full-text query, to ultimately yield a set of retrieved documents that form an output document set. This computer also hosts our inventive processing to: analyze both the query and each such document to produce its corresponding set of logical form triples; then compare the sets of triples and select, score and rank the documents in the fashion discussed above, and finally present the results to a local user, e.g., stationed thereat or accessible thereto.

Another alternate embodiment is shown in FIG. 9B, which encompasses the specific context shown in FIG. 2, wherein the retrieval system is formed of a client PC networked to a remote server. Here, client PC 920 is connected, via network connection 925, to remote computer (server) 930. A user stationed at client PC 920 enters a full-text query which the PC, in turn, transmits over the network connection to the remote server. The client PC also analyzes the query to produce its corresponding set of logical form triples. The server hosts, e.g., a conventional statistical search engine and consequently, in response to the query, undertakes statistical retrieval to yield a set of document records. The server then returns the set of records and ultimately, either on instruction of the client or autonomously based on the capabilities of the search engine or associated software, returns each document in an output document set to the client PC. The client PC then analyzes each of the corresponding documents, in the output document set, it receives to produce a set of logical form triples therefor. The client PC then completes its processing by appropriately comparing the sets of triples and selecting, scoring and ranking the documents in the fashion discussed above, and finally presenting the results to the local user.

A further embodiment is shown in FIG. 9C. Though this embodiment employs the same physical hardware and network connections as in FIG. 9B, client PC 920 accepts a full-text query from a local user and transmits that query onward, via networked connection 925, to remote computer (server) 930. This server, instead of merely hosting a conventional search engine, also provides natural language processing in accordance with our invention. In this case, the server, rather than the client PC, would appropriately analyze the query to produce a corresponding set of logical form triples therefor. The server would also download, if necessary, each retrieved document in an output document set and then analyze each such document to produce the corresponding sets of logical form triples therefor. Thereafter, the server would appropriately compare the sets of triples for the query and documents and select, score and rank the documents in the fashion discussed above. Once this ranking has occurred, then server 930 would transmit the remaining retrieved documents in rank order, via networked connection 925, to client PC 920 for display thereat. The server could transmit these documents either on a group-by-group basis, as instructed by the user in the manner set forth above, or all in seriatim for group-by-group selection thereamong and display at the client PC.

Moreover, remote computer (server) 930 need not be implemented just by a single computer that provides all the conventional retrieval, natural language and associated processing noted above, but can be a distributed processing system as shown in FIG. 9D with the processing undertaken by this server being distributed amongst individual servers therein. Here, server 930 is formed of front-end processor 940 which distributes messages, via connections 950, to a series of servers 960 (containing server 1, server 2, ... , server n). Each of these servers implements a specific portion of our inventive process. In that regard, server 1 can be used to index input documents into dataset on a mass data store for subsequent retrieval. Server 2 can implement a search engine, such as a conventional statistical engine, for retrieving, in response to a user-supplied query routed to it by front-end processor 940, a set of document records from the mass data store. These records would be routed, from server 2, via front-end processor 940, to, e.g., server n for subsequent processing, such as downloading each corresponding document, in an output document set, from a corresponding web site or database. Front-end processor 940 would also route the query to server n. Server n would then appropriately analyze the query and each document to produce the corresponding sets of logical form triples and then appropriately compare the sets of triples and select, score and rank the documents in the fashion discussed above and return ranked documents, via front-end processor 940, to client PC 920 for ranked display thereat. Of course, the various operations used in our inventive processing could be distributed across servers 960 in any one of many other ways, whether static or dynamic, depending upon run-time and/or other conditions occurring thereat. Furthermore, server 930 could be implemented by illustratively a well-known sysplex configuration with a shared direct access storage device (DASD) accessible by all processors therein (or other similar distributed multi-processing environment) with, e.g., the database for the conventional search engine and the lexicon used for natural language processing both stored thereon.

Though we have described our invention as downloading documents in response to each retrieved document record and then locally analyzing that document, though, e.g., a client PC, to produce its corresponding logical form triples, these triples could alternatively be generated while the document is being indexed by a search engine. In that regard, as the search engine locates each new document for indexing, through, e.g. use of a web crawler, the engine could download a complete file for that document and then either immediately thereafter or later, via a batch process, preprocess the document by analyzing that document and producing its logical form triples. To complete the preprocessing, the search engine would then store these triples, as part of an indexed record for that document, in its database. Subsequently, whenever that document record is retrieved, such as in response to a search query, the triples therefor will be returned as part of the document record to the client PC for purposes of comparison and so forth. By virtue of preprocessing the documents in the search engine, a substantial amount of processing time at the client PC can be advantageously saved, thereby increasing client throughput.

Furthermore, though we have discussed our invention in the specific context of use with an Internet-based search engine, our invention is equally applicable to use with: (a) any network accessible search engine, whether it be intranet-based or not, accessible through a dedicated network facility or otherwise; (b) a localized search engine operative with its own stored dataset, such as a CD-ROM based data retrieval application typified by an encyclopedia, almanac or other self-contained stand-alone dataset; and/or (c) any combination thereof.

Figure 10B:
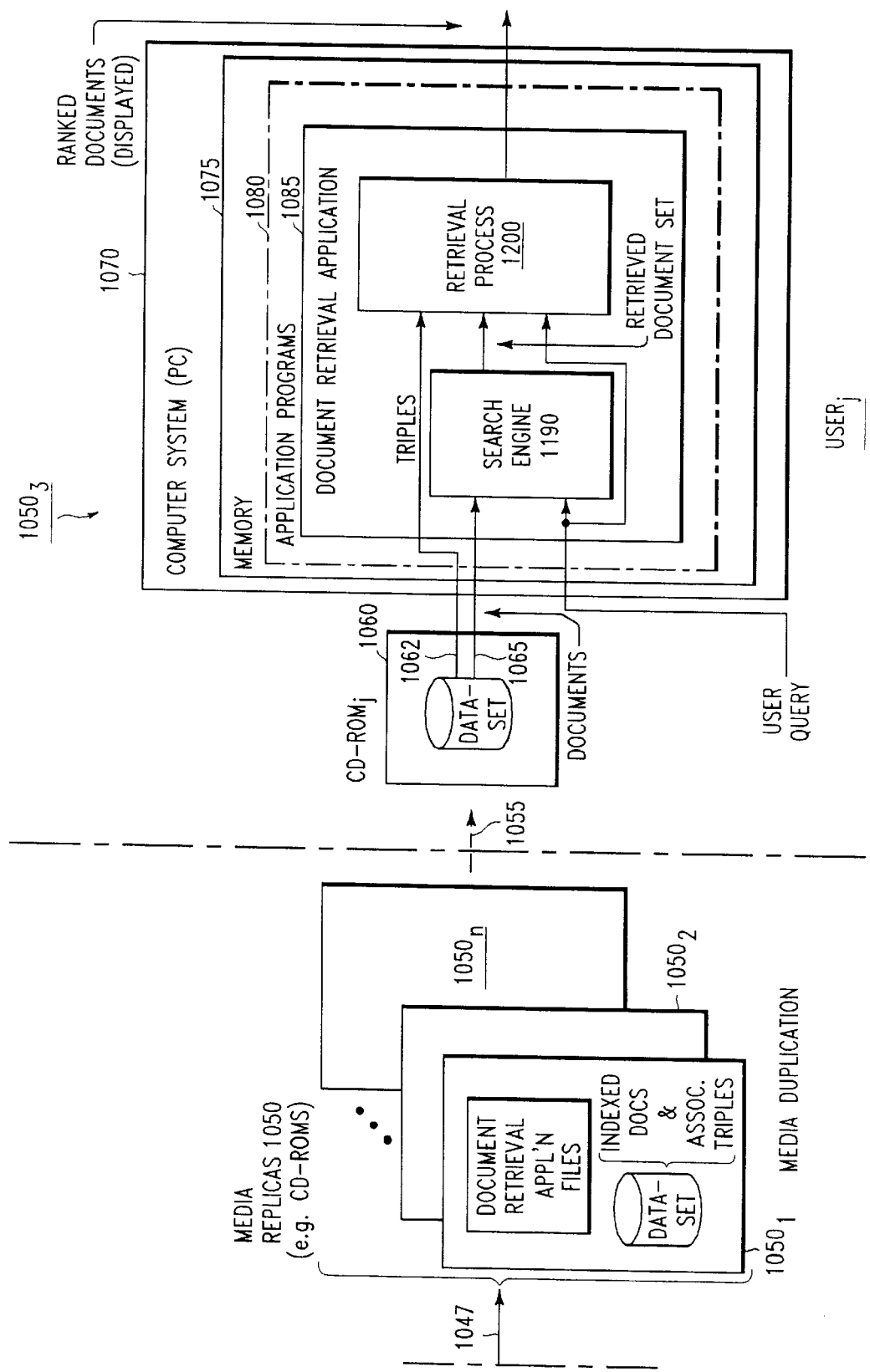

With the above in mind, FIGS. 10A and 10B collectively depict yet another embodiment of our present invention which generates logical form triples through document preprocessing with the resulting triples, document records and documents themselves being collectively stored, as a self-contained stand-alone dataset, on common storage media, such as one or more CD-ROMs or other transportable mass media (typified by removable hard disk, tape, or magneto-optical or large capacity magnetic or electronic storage devices), for ready distribution to end-users. The correct depiction of the drawing sheets for these figures is shown in FIG. 10. By collectively placing on, common media, the retrieval application itself and the accompanying dataset which is to be searched, a stand-alone data retrieval applications results; hence, eliminating a need for a network connection to a remote server to retrieve documents.

As shown, this embodiment is comprised of essentially three components: document indexing component $1005_1$, duplication component $1005_2$ and user component $1005_3$. Component $1005_1$ gathers documents for indexing into a dataset, illustratively dataset 1030, that, in turn, will form the document repository for a self-contained document retrieval application, such as, e.g., an encyclopedia, almanac, specialized library (such as a decisional law reporter), journal collection or the like. With the rapidly diminishing cost associated with duplicating CD-ROMs and other forms of media that have substantial storage capacity, this embodiment is particularly attractive to cost-effectively disseminate large collections of documents, together with the ability to accurately search through the collection, to a wide user community.

Figure 11:
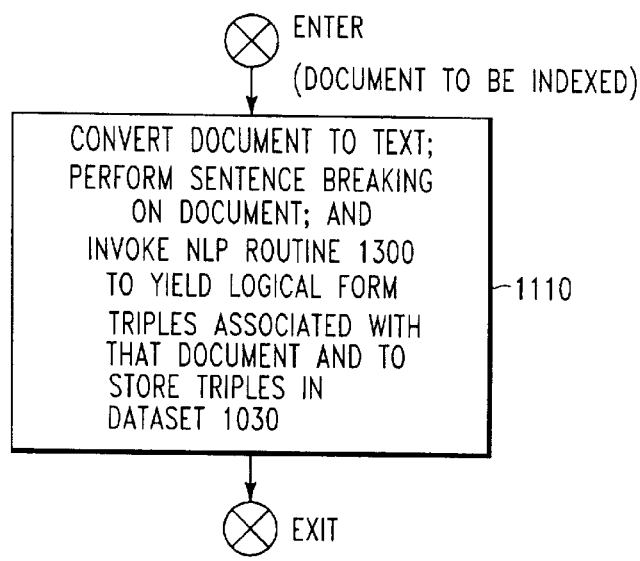
FIG. 11 depicts Triple Generation process 1100 that is performed by Document Indexing engine 1015 shown in FIGS. 10A and 10B.

In any event, incoming documents to be indexed into the dataset are gathered from any number of a wide variety of sources and applied, in seriatim, to computer 1010. This computer implements, through appropriate software stored within memory 1015, a document indexing engine which establishes a record within dataset 1030 for each such document and stores information into that record for the document, and also establishes an appropriate stored entry, in the dataset, containing a copy of the document itself. Engine 1015 executes triple generation process 1100. This process, to be described in detail below in conjunction with FIG. 11, is separately executed for each document being indexed. In essence, this process, in essentially the same manner as discussed above for block 640 shown in FIGS. 6A and 6B, analyzes the textual phrases in the document and, through so doing, constructs and stores a corresponding set of logical form triples, for that document, within dataset 1030. Inasmuch as all other processes executed by indexing engine 1010, shown in FIGS. 10A and 10B, to index a document, including generating an appropriate record therefor, are all irrelevant to the present invention, we will not address them in any detail. Suffice it to say, that once the set of triples is generated through process 1100, engine 1015 stores this set onto dataset 1030 along with a copy of the document itself and the document record created therefor. Hence, dataset 1030, at the conclusion of all indexing operations, not only stores a complete copy of every document indexed therein and a record therefor, but also stores a set of logical form triples for that document.

Once all the desired documents are appropriately indexed, dataset 1030, being viewed as a "Master Dataset" is itself then duplicated through duplication component 1005$_2$. Within component 1005$_2$, conventional media duplication system 1040 repetitively writes a copy of the contents of the master dataset, as supplied over line 1035, along with a copy of appropriate files for the retrieval software including a retrieval process and a user installation program, as supplied over line 1043, onto common storage media, such one or more CD-ROMs, to collectively form the stand-alone document retrieval application. Through system 1040, a series 1050 of media replicas 1050 is produced having individual replicas 1050$_1$, 1050$_2$, . . . 1050$_n$. All the replicas are identical and contain, as specifically shown for replica 1050$_1$, a copy of the document retrieval application files, as supplied over line 1043, and a copy of dataset 1030, as supplied over line 1035. Depending on the size and organization of the dataset, each replica may extend over one or more separate media, e.g. separate CD-ROMs. Subsequently, the replicas are distributed, typically by a purchased license, throughout a user community, as symbolized by dashed line 1055.

Once a user, e.g. User$_j$, obtains a replica, such as CD-ROM$_j$ (also denoted as CD-ROM 1060), as depicted in user component 1005$_3$, the user can execute the document retrieval application, including our present invention, through computer system 1070 (such as a PC having a substantially, if not identical architecture, to client PC 300 shown in FIG. 3), against the dataset stored in CD-ROM$_j$ to retrieve desired documents therefrom. In particular, after the user obtains CD-ROM$_j$, the user inserts the CD-ROM into PC 1070 and proceeds to execute the installation program stored on the CD-ROM in order to create and install a copy of the document retrieval application files into memory 1075, usually a predefined directory within a hard disk, of the PC, thereby establishing document retrieval application 1085 on the PC. This application contains search engine 1090 and retrieval process 1200. Once installation is complete and application 1085 is invoked, the user can then search through the dataset on CD-ROM$_j$ by providing an appropriate full-text query to the application. In response to the query, the search engine retrieves, from the dataset, a document set including the records for those documents and the stored logical form triples for each such document. The query is also applied to retrieval process 1200. This process, very similar to that of retrieval process 600 discussed above in conjunction with FIGS. 6A and 6B, analyzes the query and constructs the logical form triples therefor. Thereafter, process 1200, shown in FIGS. 10A and 10B, compares the logical form triples for each of the retrieved documents, specifically the records therefor, in the set against the triples for the query. Based on the occurrence of matching triples therebetween and their weights, process 1200 then scores, in the manner described in detail above, each of the documents that exhibits at least one matching triple, ranks these documents in terms of descending score, and finally visually presents the user with a small group of the document records, typically 5–20 or less, that have the highest rankings. The user, upon reviewing these records, can then instruct the document retrieval application to retrieve and display an entire copy of any of the associated documents that appears to be interest. Once the user has reviewed a first group of document records for a first group of retrieved documents, the user can then request a next group of document records having the next highest rankings, and so forth until all the retrieved document records have been so reviewed. Though application 1085 initially returns ranked document records in response to a query, this application could alternatively return ranked copies of the documents themselves in response to the query.

FIG. 11 depicts Triple Generation process 1100 that is performed by Document Indexing engine 1015 shown in FIGS. 10A and 10B. As discussed above, process 1100 preprocesses a document to be indexed by analyzing the textual phrases in that document and, through so doing, constructing and storing a corresponding set of logical form triples, for that document, within dataset 1030. In particular, upon entry into process 1100, block 1110 is executed. This block first extracts all the text from that document, including any text situated within HTML tags associated with that document. Thereafter, to facilitate natural language processing which operates on a single sentence at a time, the text for each document is broken into a text file, through a conventional sentence breaker, in which each sentence (or question) occupies a separate line in the file. Thereafter, block 1110 invokes NLP routine 1300 (which will be discussed in detail below in conjunction with FIG. 13A), separately for each line of text in that document, to analyze this document and construct and locally store a corresponding set of logical form triples for that line and stored the set within dataset 1030. Once these operations have been completed, execution exits from block 1110 and process 1100.

Figure 12A:
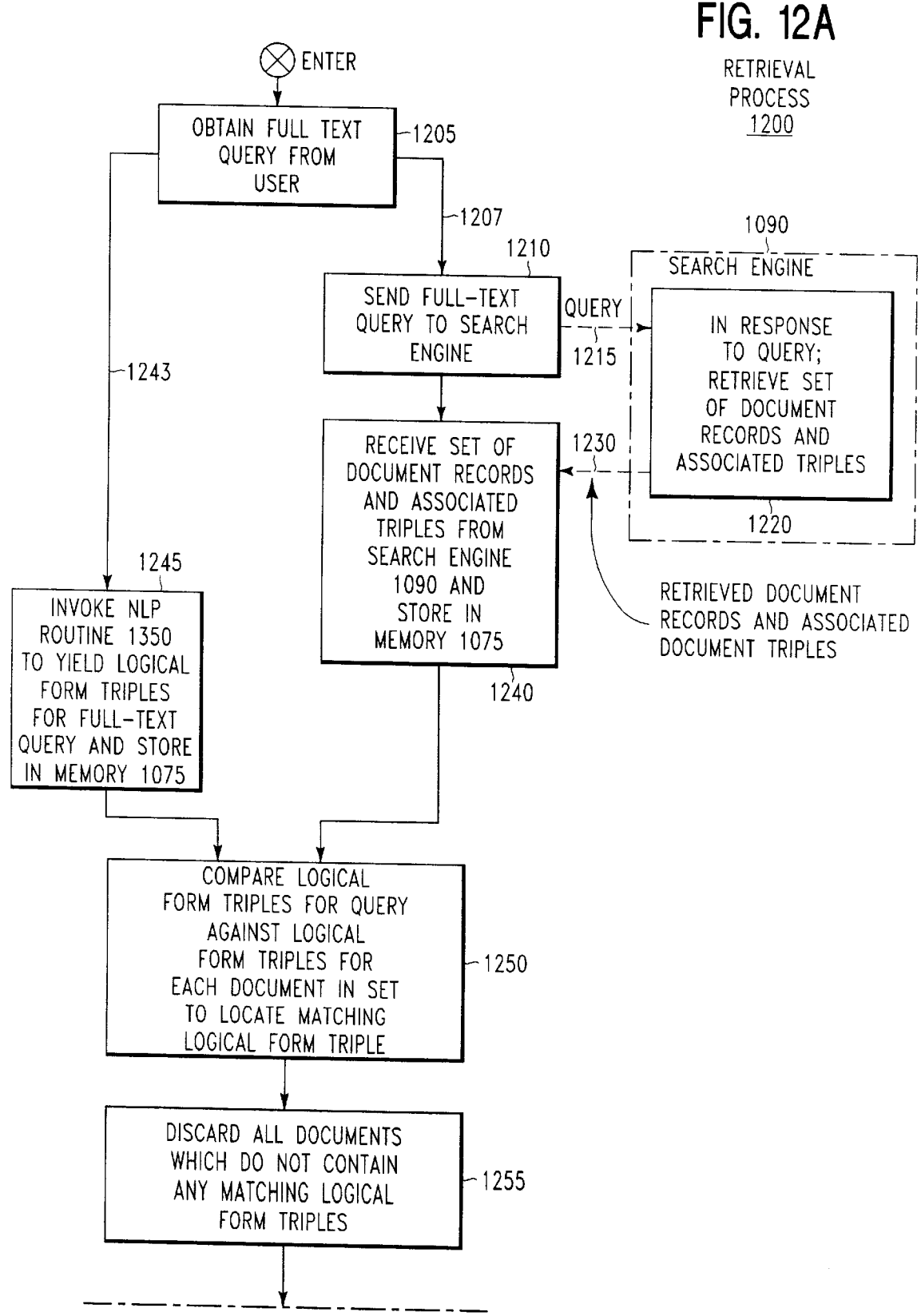
Figure 12:
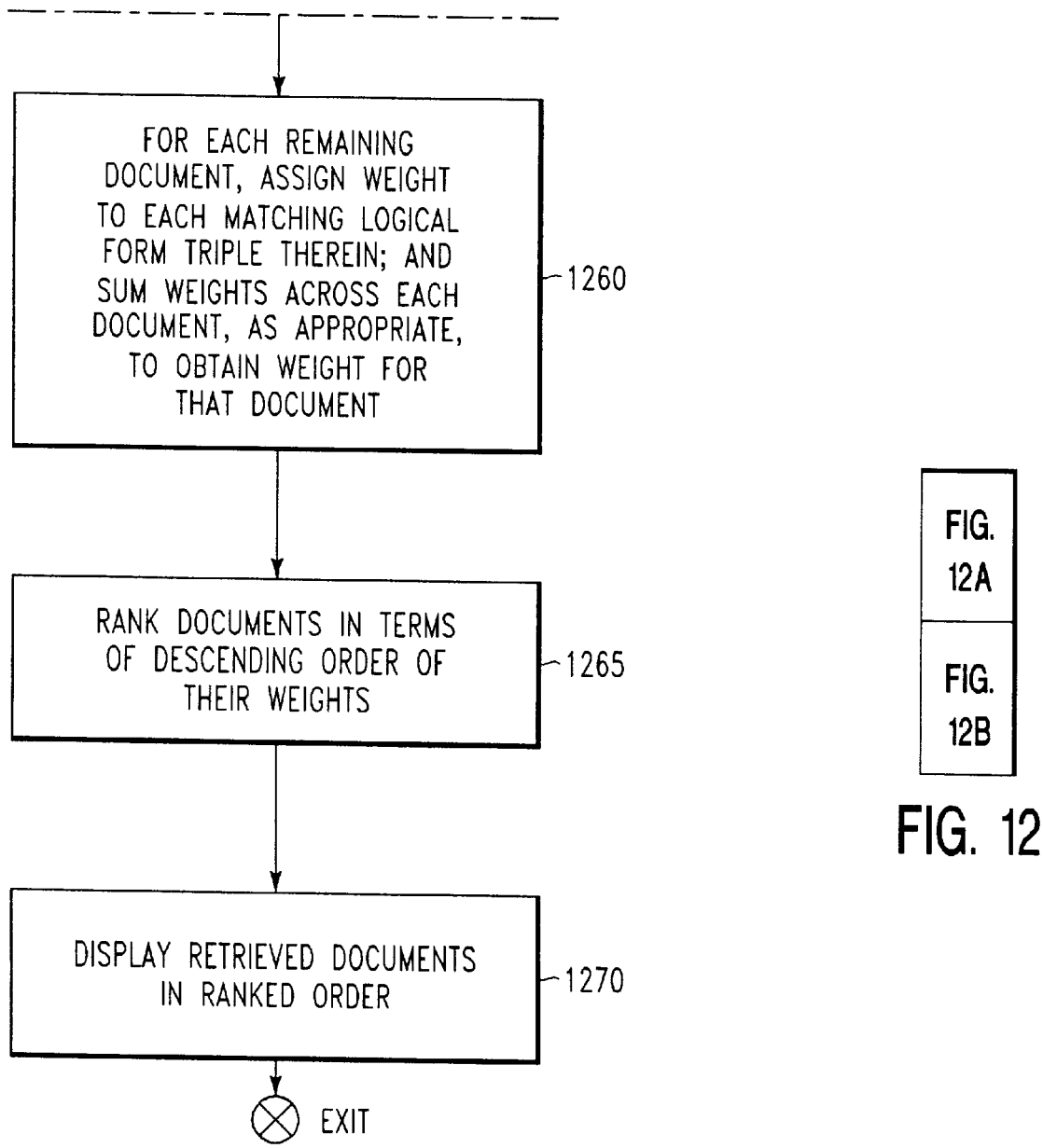
FIG. 12 depicts the correct alignment of the drawing sheets for FIGS. 12A and 12B.

A flowchart of our inventive retrieval process 1200, as used in the specific embodiment of our invention shown in FIGS. 10A and 10B is collectively depicted in FIGS. 12A and 12B; for which the correct alignment of the drawing sheets for these figures is shown in FIG. 12. In contrast with Retrieval process 600 (shown in FIGS. 6A and 6B and discussed in detail above), all the operations shown in FIGS. 12A and 12B are performed on a common computer system, here PC 1070 (see FIGS. 10A and 10B). To simplify understanding, the reader should also simultaneously refer to FIGS. 10A and 10B throughout the following discussion.

Upon entry into process 1200, execution proceeds first to block 1205. This block, when executed, prompts a user to enter a full-text query. Once this query is obtained, execution splits and proceeds, via path 1207, to block 1210 and, via path 1243, to path 1245. Block 1245, when performed, invokes NLP routine 1350 to analyze the query and construct and locally store its corresponding set of logical form triples within memory 1075. Block 1210, when performed, transmits, as symbolized by dashed line 1215, the full-text query to search engine 1090. At this point, the search engine performs block 1220 to retrieve both a set of document records in response to the query and the associated logical form triples associated with each such record. Once this set and the associated logical form triples are retrieved, both are then applied, as symbolized by dashed line 1230, back to process 1200 and specifically to block 1240 therein. Block 1240 merely receives this information from search engine 1090 and stores it within memory 1075 for subsequent use. Though the operations in block 1245 have been discussed as being performed essentially in parallel with those in blocks 1210, 1090 and 1220, the operations in block 1245, based on actual implementation considerations, could be performed serially either before or after the operations in blocks 1210, 1090 or 1220.

Once the sets of logical form triples have been stored in memory 1075 for both the query and for each of the retrieved document records, block 1250 is performed. This block compares, in the manner described in detail above, each of the logical form triples in the query against each of the logical form triples for each of the retrieved document records to locate a match between any triple in the query and any triple in any of the corresponding documents. Once block 1250 completes, block 1255 is performed to discard all retrieved records for documents that do not exhibit a matching triple, i.e., having no triple that matches any triple in the query. Thereafter, block 1260 is performed. Through block 1260, all remaining document records are assigned a score as defined above and based on the relation type(s) of matching triples and their weights, that exist for each of the corresponding documents. Once the document records are so weighted, block 1265 is performed to rank order the records in order of descending score. Finally, block 1270 is performed to display the records in rank order, typically in terms of a small predefined group of document records, typically five or ten, that exhibit the highest scores. Thereafter, the user, can, for example, by appropriately "clicking" his(her) mouse on a corresponding button displayed by computer system 1070, have that system display the next group of ranked document records, and so forth until the user has sufficiently examined all the ranked document records (and has accessed and examined any document of interest therein) in succession, at which point process 1200 is completed with execution then exiting therefrom.

Figure 13A:
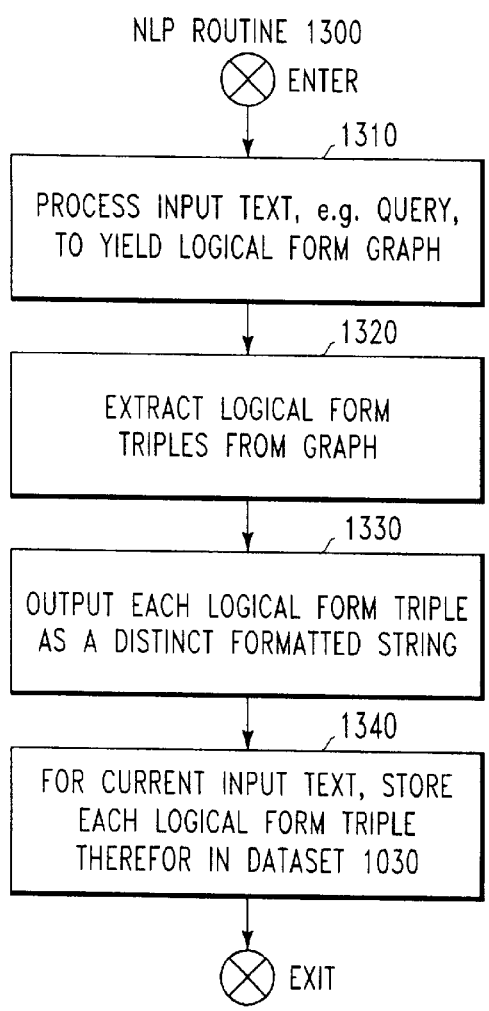
FIG. 13A depicts a flowchart of NLP routine 1300 which is executed within Triple Generation process 1100.

FIG. 13A depicts a flowchart of NLP routine 1300 which is executed within Triple Generation process 1100 shown in FIG. 11. As stated above, NLP routine 1300 analyzes an incoming document to be indexed, specifically a single line of text therefor, and constructs and locally stores a corresponding set of logical form triples for that document within dataset 1030, shown in FIGS. 10A and 10B. Routine 1300 operates in essentially the same fashion as does NLP routine 700 shown in FIG. 7 and discussed in detail above.

In particular, upon entry into routine 1300, block 1310 is first executed to process a line of input text to yield a logical form graph, such as illustrative graph 515 shown in FIG. 5A. Thereafter, as shown in FIG. 13A, block 1320 is performed to extract (read) a set of corresponding logical form triples from the graph. Once this occurs, block 1330 is executed to generate each such logical form triple as a separate and distinct formatted text string. Finally, block 1340 is executed to store, in dataset 1030, the line of input text and, as a series of formatted text strings, the set of logical form triples for that line. Once this set has been completely stored, execution exits from block 1300. Alternatively, if in lieu of logical form triples, a different form, e.g. a logical form graph or sub-graph thereof, is to be used in conjunction with our invention, then blocks 1320 and 1330 would be readily modified to generate that particular form as the formatted string, with block 1340 storing that form in lieu of logical form triples into the dataset.

Figure 13B:
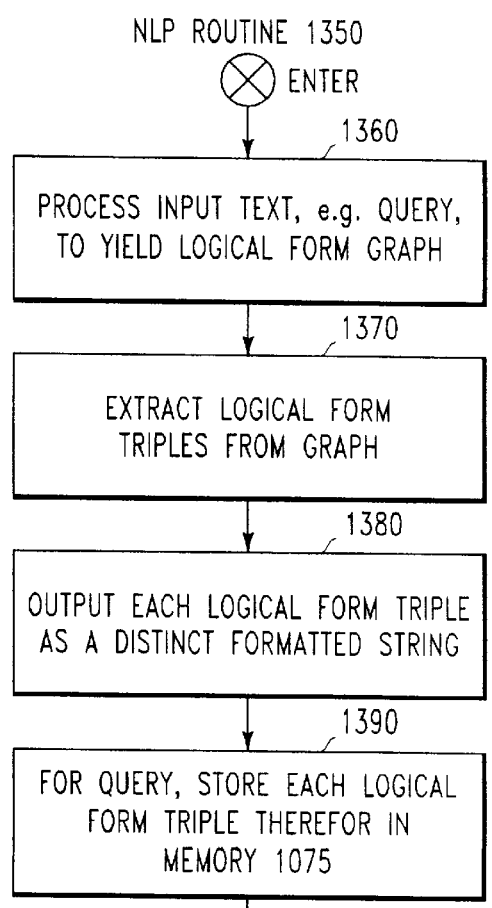
FIG. 13B depicts a flowchart of NLP routine 1350 which is executed within Retrieval process 1200.

FIG. 13B depicts a flowchart of NLP routine 1350 which is executed within Retrieval process 1200. As stated above, NLP routine 1350 analyzes a query supplied by Userj to document retrieval application 1085 (shown in FIGS. 10A and 10B) and constructs and locally stores a corresponding set of logical form triples therefor and within memory 1075. The only difference in operation between routine 1350 and routine 1300, discussed in detail above in conjunction with FIG. 13A, lies in the location where the corresponding triples are stored, i.e. in dataset 1030 through execution of block 1340 in NLP routine 1300 and in memory 1075 through execution of block 1390 for NLP routine 1350. Inasmuch as the operations performed by the other blocks, specifically blocks 1360, 1370 and 1380, of routine 1350 are substantially the same as those performed by blocks 1310, 1320 and 1330, respectively, in routine 1300, we will dispense with discussing the former blocks in any detail.

To experimentally test the performance of our inventive retrieval process, as generally described above in conjunction with FIG. 1, we used the ALTA VISTA search engine as the search engine in our retrieval system. This engine, which is publicly accessible on the Internet, is a conventional statistical search engine that ostensibly has over 31 million indexed web pages therein and is widely used (to the order of approximately and currently 28 million hits per day). We implemented our inventive retrieval process 600 on a standard Pentium 90 MHz PC using various natural language processing components, including a dictionary file, that are contained within a grammar checker that forms a portion of MICROSOFT OFFICE 97 program suite ("OFFICE" and "OFFICE 97" are trademarks of Microsoft Corporation of Redmond, Wash.). We used an on-line pipelined processing model, i.e., documents were gathered and processed online in a pipelined fashion while a user waited for ensuing results. Through this particular PC, approximately one-third to one-half second were required to generate logical form triples for each sentence.

Volunteers were asked to generate full-text queries for submission to the search engine. A total of 121 widely divergent queries were generated, with the following ones being representative: "Why was the Celtic civilization so easily conquered by the Romans?", "Why do antibiotics work on colds but not on viruses?", "Who is the governor of Washington?", "Where does the Nile cross the equator?" and "When did they start vaccinating for small pox?". We submitted each of these 121 queries to the ALTA VISTA search engine and obtained, where available, the top 30 documents that were returned in response to each query. In those instances where fewer than 30 documents were returned for some of the queries, we used all the documents that were returned. Cumulatively, for all 121 queries, we obtained 3361 documents (i.e., "raw" documents).

Each of the 3361 documents and the 121 queries were analyzed through our inventive process to produce corresponding sets of logical form triples. The sets were appropriately compared, with the resulting documents being selected, scored and ranked in the fashion discussed above.

All 3361 documents were manually and separately evaluated as to their relevance to the corresponding query for which the document was retrieved. To evaluate relevance, we utilized a human evaluator, who was unfamiliar with our specific experimental goals, to manually and subjectively rank each of these 3361 documents for its relevance, as being "optimal", "relevant" or "irrelevant", to its corresponding query. An optimal document was viewed as one which contained an explicit answer to the corresponding query. A relevant document was one that did not contain an explicit answer to the query but was nevertheless relevant thereto. An irrelevant document was one that was not a useful response to the query, e.g. a document that was irrelevant to the query, in a language other than English or could not be retrieved from a corresponding URL provided by the ALTA VISTA engine (i.e., a "cobweb" link). To increase the accuracy of the evaluation, a second human evaluator examined a sub-set of these 3361 documents, specifically those documents that exhibited at least one logical form triple that matched a logical form triple in its corresponding query (431 out of the 3361 documents), and those documents previously ranked as relevant or optimal but which did not have any matching logical form triples (102 out of the 3361 documents). Any disagreements in these rankings for a document were reviewed by a third human evaluator who served as a "tie-breaker".

As a result of this experiment, we observed that, across all the documents involved, our inventive retrieval system yielded improvements, over that of the raw documents returned by the ALTA VISTA search engine, on the order of approximately 200% in overall precision (i.e., of all documents selected) from approximately 16% to approximately 47%, and approximately 100% of precision within the top five documents from approximately 26% to approximately 51%. In addition, use of our inventive system increased the precision of the first document returned as being optimal by approximately 113% from approximately 17% to approximately 35%, over that for the raw documents.

Though we have specifically described our invention in the context of use with a statistical search engine, our invention is not so limited. In that regard, our invention can be used to process retrieved documents obtained through substantially any type of search engine in order to improve the precision of that engine.

Rather than using fixed weights for each different attribute in a logical form triple, these weights can dynamically vary and, in fact, can be made adaptive. To accomplish this, a learning mechanism, such as, e.g., a Bayesian or neural network, could be appropriately incorporated into our inventive process to vary the numeric weight for each different logical form triple to an optimal value based upon learned experiences.

Though our inventive process required logical form triples to exactly match, the criteria for determining a match, for purposes of identifying sufficiently similar semantic content across triples, can be relaxed to encompass paraphrases as matching. A paraphrase may be either lexical or structural. An example of a lexical paraphrase would be either a hypernym or a synonym. A structural paraphrase is exemplified by use of either a noun appositive or a relative clause. For example, noun appositive constructions such as "the president, Bill Clinton" should be viewed as matching relative clause constructions such as "Bill Clinton, who is president". At a semantic level, fine-grained judgments can be made as to how semantically similar two words are to one another, thereby sanctioning matches between a query "Where is coffee grown?" and sentences in a corpus such as "Coffee is frequently farmed in tropical mountainous regions." In addition, a procedure for determining whether a match exists could be modified according to a type of query being asked. For example, if a query asks where something is, then the procedure should insist that a "Location" attribute be present in any triple associated with the sentence being tested in order for it to be viewed as matching against the query. Hence, logical form triples "matches" are generically defined to encompass not only identical matches but also those that result from all such relaxed, judgmental and modified matching conditions.

Moreover, our invention can be readily combined with other processing techniques which center on retrieving non-textual information, e.g. graphics, tables, video or other, to improve overall precision. Generally speaking, non-textual content in a document is frequently accompanied in that document by a linguistic (textual) description, such as, e.g., a figure legend or short explanation. Hence, use of our inventive process, specifically the natural language components thereof, can be used to analyze and process the linguistic description that often accompanies the non-textual content. Documents could be retrieved using our inventive natural language processing technique first to locate a set of documents that exhibit linguistic content semantically relevant to a query and then processing this set of documents with respect to their non-textual content to locate a document(s) that has relevant textual and non-textual content. Alternatively, document retrieval could occur first with respect to non-textual content to retrieve a set of documents; followed by processing that set of documents, through our inventive technique, with respect to their linguistic content to locate a relevant document(s).

Although various embodiments which incorporate the teachings of the present invention have been shown and described in detail herein, those skilled in the art can readily devise many other embodiments that still utilize these teachings.

We claim:

1. Apparatus for use in an information retrieval system for retrieving stored documents from a repository, said system having a retrieval system, responsive to a query, for retrieving, from the repository, a plurality of stored documents related to the query so as to define an output document set; said apparatus comprising:

a processor; and memory having executable instructions stored therein; and wherein the processor, in response to the instructions stored in the memory:

produces, in response to the query, a first logical form therefor, wherein the first logical form portrays semantic relationships between words associated with the query;

obtains a corresponding second logical form for each different one of the documents in the output document set, wherein the second logical form portrays semantic relationships between words associated with a phrase in said one document;

ranks a plurality of the documents in the output document set as a predefined function of the first logical form of the query and the second logical form for each one of the plurality of documents in the output document set so as to define a rank order; and provides, as output and in said rank order, a plurality of stored entries associated with the output document set.

2. The apparatus in claim 1 wherein each of the entries is either a corresponding one of the documents in the output document set or a record associated with said corresponding one document.

3. The apparatus in claim 2 wherein each of the first and second logical forms, for the query and for each different document in the output document set, respectively, is a logical form graph, a sub-graph thereof or a list of logical form triples.

4. The apparatus in claim 3 wherein the processor, in response to the stored instructions:

reads, the corresponding second logical form, for said each different one of the documents in the output document set, from a storage media; or produces said corresponding second logical form by analyzing said each different one document in the output document set.

5. The apparatus in claim 4 wherein the function yields a score, for said one of the documents, based on a predetermined relationship between said first logical form associated with the query and each of said second logical forms associated with said one document, and wherein the processor, in response to the stored instructions, ranks the stored entries in accordance with the score associated with each of the documents in the output document set so as to define the rank order.

6. The apparatus in claim 5 wherein either said first or second logical forms, associated with either the query or with said one of the documents in the output document set, further comprises a paraphrase of the words associated with said query or said one of the documents, respectively.

7. The apparatus in claim 6 wherein each of said first and second logical forms comprise corresponding first and second lists of one or more logical form triples such that said logical form triples, in said first and second lists, are each comprised of a stem form of each of two words, which are semantically related in a corresponding logical form graph, in the query or a phrase in said each one of the documents, respectively, and a predefined relation representing a semantic relationship between the two words.

8. The apparatus in claim 5 wherein said match between said first logical form associated with the query and said any of the second logical forms associated with any document in the output document set is an identical match.

9. The apparatus in claim 8 wherein each of said first and second logical forms comprise corresponding first and second lists of one or more logical form triples such that said logical form triples, in said first and second lists, are each comprised of a stem form of each of two words, which are semantically related in a corresponding logical form graph, in the query or a phrase in said each one of the documents, respectively, and a predefined relation representing a semantic relationship between the two words.

10. The apparatus in claim 5 wherein the repository comprises a dataset.

11. The apparatus in claim 5 wherein the query is a full-text query.

12. The apparatus in claim 5 wherein the retrieval system comprises a statistical search engine.

13. The apparatus in claim 5 further comprising:

a client computer for obtaining a query from a user and for displaying, in said rank order, the plurality of documents in the output document set; and a server connected, via a networked connection, to the client computer, said server comprising said processor and said memory, wherein the processor, in response to the instructions stored in the memory:

obtains the query from the client computer, and provides said plurality of documents in the output document set in said rank order to the client computer.

14. The apparatus in claim 13 wherein the server comprises a plurality of individual servers.

15. The apparatus in claim 13 wherein the retrieval system comprises a statistical search engine.

16. The apparatus in claim 15 wherein the networked connection is an Internet or intranet connection.

17. The apparatus in claim 16 wherein the search engine, in response to the query, retrieves a stored record from the repository for each one of said plurality of documents in the output document set, the record containing information specifying where said each one of the documents in the output document set can be found; and the processor, in response to the instructions stored in the memory and the information contained in the record, accesses and downloads said each one of the documents from an associated server therefor for inclusion within the output document set.

18. The apparatus in claim 5 further comprising:

a client computer having said processor and said memory; and a server connected, via a networked connection to the client computer, said server implementing said retrieval system and supplying, in response to the query provided by the client computer, said output document set to the client computer.

19. The apparatus in claim 18 wherein the retrieval system comprises a statistical search engine.

20. The apparatus in claim 19 wherein the networked connection is an Internet or intranet connection.

21. The apparatus in claim 20 wherein the search engine, in response to the query, retrieves a stored record from the repository for each one of said plurality of documents in the output document set, the record containing information specifying where said each one of the documents in the output document set can be found; and the processor, in response to the instructions stored in the memory and the information contained in the record, accesses and downloads said each one of the documents from an associated server therefor for inclusion within the output document set.

22. The apparatus in claim 5 further comprising a computer having said processor and said memory, wherein the computer in response to instructions stored in the memory, also implements said retrieval system.

23. The apparatus in claim 22 wherein the retrieval system comprises a statistical search engine.

24. The apparatus in claim 5 wherein the score for said one document is also a predetermined function of node words in the second logical forms for said one document, a frequency or semantic content of said node words in said one document, frequency or semantic content of predefined node words in said one document, a frequency of specific logical form triples for said one document, or a length of said one document.

25. The apparatus in claim 24 wherein the query is a full-text query.

26. The apparatus in claim 24 wherein the retrieval system comprises a statistical search engine.

27. The apparatus in claim 24 further comprising:

a client computer for obtaining a query from a user and for displaying, in said rank order, the plurality of documents in the output document set; and a server connected, via a networked connection, to the client computer, said server comprising said processor and said memory, wherein the processor, in response to the instructions stored in the memory:

obtains the query from the client computer, and provides said plurality of documents in the output document set in said rank order to the client computer.

28. The apparatus in claim 27 wherein the server comprises a plurality of individual servers.

29. The apparatus in claim 27 wherein the retrieval system comprises a statistical search engine.

30. The apparatus in claim 29 wherein the networked connection is an Internet or intranet connection.

31. The apparatus in claim 30 wherein the search engine, in response to the query, retrieves a stored record from the repository for each one of said plurality of documents in the output document set, the record containing information specifying where said each one of the documents in the output document set can be found; and the processor, in response to the instructions stored in the memory and the information contained in the record, accesses and downloads said each one of the documents from an associated server therefor for inclusion within the output document set.

32. The apparatus in claim 24 further comprising:
 a client computer having said processor and said memory; and
 a server connected, via a networked connection to the client computer, said server implementing said retrieval system and supplying, in response to the query provided by the client computer, said output document set to the client computer.

33. The apparatus in claim 32 wherein the retrieval system comprises a statistical search engine.

34. The apparatus in claim 33 wherein the networked connection is an Internet or intranet connection.

35. The apparatus in claim 34 wherein the search engine, in response to the query, retrieves a stored record from the repository for each one of said plurality of documents in the output document set, the record containing information specifying where said each one of the documents in the output document set can be found; and the processor, in response to the instructions stored in the memory and the information contained in the record, accesses and downloads said each one of the documents from an associated server therefor for inclusion within the output document set.

36. The apparatus in claim 24 further comprising a computer having said processor and said memory, wherein the computer in response to instructions stored in the memory, also implements said retrieval system.

37. The apparatus in claim 36 wherein the retrieval system comprises a statistical search engine.

38. The apparatus in claim 5 wherein each of said first and second logical forms comprise corresponding first and second lists of one or more logical form triples such that said logical form triples, in said first and second lists, are each comprised of a stem form of each of two words, which are semantically related in a corresponding logical form graph, in the query or a phrase in said each one of the documents, respectively, and a predefined relation representing a semantic relationship between the two words.

39. The apparatus in claim 38 wherein either said first or second lists of logical form triples, associated with either the query or with said one of the documents in the output document set, further comprises a paraphrase of the words associated with said query or said one of the documents, respectively.

40. The apparatus in claim 38 wherein the score for said one document is also a predetermined function of node words in the second logical forms for said one document, a frequency or semantic content of said node words in said one document, a frequency or semantic content of predefined node words in said one document, frequency of specific logical form triples for said one document, or a length of said one document.

41. The apparatus in claim 38 wherein the function is a sum of weights taken across the logical form triples, associated with each of said plurality of documents in the output document set, that identically match at least one of the logical form triples associated with the query, wherein a weight assigned to each matching logical form triple is defined by a type of semantic relation associated therewith.

42. The apparatus in claim 41 wherein the processor, in response to the instructions stored in the memory:
 determines whether any of the logical form triples associated with the query matches any of the logical form triples associated with any document in the output document set so as to define a matching triple associated with said any document;
 for every one of documents in said output document set that has at least one matching logical form triple associated therewith, weights matching logical form triples in said every one document using a numeric weight predefined by the semantic relationship associated with said each matching logical form triple so as to form one or more weights for said one document;
 calculates a score for said one document as a function of said one or more weights; and
 ranks every one of said documents in accordance with said score thereof so as to define the rank order.

43. The apparatus in claim 42 wherein the rank order is descending weight order.

44. The apparatus in claim 38 wherein the processor, in response to the instructions stored in the memory, presents a first predefined group of said entries for said output document set that has highest successive rankings of the documents in said output document set.

45. The apparatus in claim 44 wherein the plurality of documents in the output document set consists of documents in said output document set that have at least one matching triple associated therewith.

46. The apparatus in claim 45 wherein each of said first and second logical form triples is comprised of a stem form of each of two words, which are semantically related in a corresponding logical form graph, in the query or a phrase in said each one of the documents, respectively, and a predefined relation representing a semantic relationship between the two words.

47. The apparatus in claim 38 wherein said logical form triples, associated with either the query or with said one of the documents in the output document set, further comprise a logical form triple containing a hypernym or synonym of either of said words.

48. The apparatus in claim 38 wherein said match between said any of the logical form triples associated with the query and said any of the logical form triples associated with any document in the output document set is an identical match.

49. The apparatus in claim 38 wherein the repository comprises a dataset.

50. The apparatus in claim 38 wherein the query is a full-text query.

51. The apparatus in claim 38 wherein the retrieval system comprises a statistical search engine.

52. The apparatus in claim 38 further comprising:
 a client computer for obtaining a query from a user and for displaying, in said rank order, the plurality of documents in the output document set; and
 a server connected, via a networked connection, to the client computer, said server comprising said processor and said memory, wherein the processor, in response to the instructions stored in the memory:
 obtains the query from the client computer, and provides said plurality of documents in the output document set in said rank order to the client computer.

53. The apparatus in claim 52 wherein the server comprises a plurality of individual servers.

54. The apparatus in claim 52 wherein the retrieval system comprises a statistical search engine.

55. The apparatus in claim 54 wherein the networked connection is an Internet or intranet connection.

56. The apparatus in claim 55 wherein the search engine, in response to the query, retrieves a stored record from the repository for each one of said plurality of documents in the output document set, the record containing information specifying where said each one of the documents in the output document set can be found; and the processor, in response to the instructions stored in the memory and the information contained in the record, accesses and downloads said each one of the documents from an associated server therefor for inclusion within the output document set.

57. The apparatus in claim 38 further comprising:
a client computer having said processor and said memory; and
a server connected, via a networked connection to the client computer, said server implementing said retrieval system and supplying, in response to the query provided by the client computer, said output document set to the client computer.

58. The apparatus in claim 57 wherein the retrieval system comprises a statistical search engine.

59. The apparatus in claim 58 wherein the networked connection is an Internet or intranet connection.

60. The apparatus in claim 59 wherein the search engine, in response to the query, retrieves a stored record from the repository for each one of said plurality of documents in the output document set, the record containing information specifying where said each one of the documents in the output document set can be found; and the processor, in response to the instructions stored in the memory and the information contained in the record, accesses and downloads said each one of the documents from an associated server therefor for inclusion within the output document set.

61. The apparatus in claim 38 further comprising a computer having said processor and said memory, wherein the computer in response to instructions stored in the memory, also implements said retrieval system.

62. The apparatus in claim 61 wherein the retrieval system comprises a statistical search engine.

63. A method for use in an information retrieval system for retrieving stored documents from a repository, said system having a retrieval system, responsive to a query, for retrieving, from the repository, a plurality of stored documents related to the query so as to define an output document set; the method comprising the steps of:
producing, in response to the query, a first logical form therefor, wherein the first logical form portrays semantic relationships between words associated with the query;
obtaining a corresponding second logical form for each different one of the documents in the output document set, wherein the second logical form portrays semantic relationships between words associated with a phrase in said one document;
ranking a plurality of the documents in the output document set as a predefined function of the first logical form of the query and the second logical form for each one of the plurality of documents in the output document set so as to define a rank order; and
providing, as output and in said rank order, a plurality of stored entries associated with the output document set.

64. The method in claim 63 wherein each of the entries is either a corresponding one of the documents in the output document set or a record associated with said corresponding one document.

65. The method in claim 64 wherein each of the first and second logical forms, for the query and for each different document in the output document set, respectively, is a logical form graph, sub-graph thereof or a list of logical form triples.

66. The method in claim 65 wherein the obtaining step comprises the step of:
reading, the corresponding second logical form, for said each different one of the documents in the output document set, from a storage media; or
producing said corresponding second logical form by analyzing said each different one document in the output document set.

67. The method in claim 66 wherein the function yields a score, for said one of the documents, based on a predetermined relationship between said first logical form associated with the query and each of said second logical forms associated with said one document, and wherein the ranking step comprises the step of ranking the stored entries in accordance with the score associated with each of the documents in the output document set so as to define the rank order.

68. The method in claim 67 wherein either said first or second logical forms, associated with either the query or with said one of the documents in the output document set, further comprises a paraphrase of the words associated with said query or said one of the documents, respectively.

69. The method in claim 68 wherein each of said first and second logical forms comprise corresponding first and second lists of one or more logical form triples such that said logical form triples, in said first and second lists, are each comprised of a stem form of each of two words, which are semantically related in a corresponding logical form graph, in the query or a phrase in said each one of the documents, respectively, and a predefined relation representing a semantic relationship between the two words.

70. The method in claim 67 wherein said match between said any of the first logical form associated with the query and said any of the second logical forms associated with any document in the output document set is an identical match.

71. The method in claim 70 wherein each of said first and second logical forms comprise corresponding first and second lists of one or more logical form triples such that said logical form triples, in said first and second lists, are each comprised of a stem form of each of two words, which are semantically related in a corresponding logical form graph, in the query or a phrase in said each one of the documents, respectively, and a predefined relation representing a semantic relationship between the two words.

72. The method in claim 67 wherein the repository comprises a dataset.

73. The method in claim 67 wherein the query is a full-text query.

74. The method in claim 67 wherein the retrieval system comprises a statistical search engine.

75. The method in claim 67 wherein the system further comprises a client computer, wherein the method comprises the steps, in the client computer of:
obtaining a query from a user; and
displaying, in said rank order, the plurality of documents in the output document set; and the system further comprises a server connected, via a networked connection, to the client computer, wherein the method further comprises the steps, in the server, of:

obtaining the query from the client computer, and providing said plurality of documents in the output document set in said rank order to the client computer.

76. The method in claim 75 wherein the retrieval system comprises a statistical search engine.

77. The method in claim 76 wherein the networked connection is an Internet or intranet connection.

78. The method in claim 77 further comprising the steps, in the search engine and in response to the query, of retrieving a stored record from the repository for each one of said plurality of documents in the output document set, the record containing information specifying where said each one of the documents in the output document set can be found; and in the server and in response to information contained in the record, of accessing and downloading said each one of the documents from an associated server therefor for inclusion within the output document set.

79. The method in claim 67 wherein the system further comprises a client computer and a server connected, via a networked connection to the client computer, said server implementing said retrieval system; wherein the method further comprises the step, in the server, of supplying, in response to the query provided by the client computer, said output document set to the client computer.

80. The method in claim 79 wherein the retrieval system comprises a statistical search engine.

81. The method in claim 80 wherein the networked connection is an Internet or intranet connection.

82. The method in claim 81 further comprising the steps, in the search engine and in response to the query, of retrieving a stored record from the repository for each one of said plurality of documents in the output document set, the record containing information specifying where said each one of the documents in the output document set can be found; and in the client computer, in response to information contained in the record, of accessing and downloading said each one of the documents from an associated server therefor for inclusion within the output document set.

83. The method in claim 67 wherein the system further comprises a computer, wherein the method comprises the step, in the computer, of implementing said retrieval system.

84. The method in claim 83 wherein the retrieval system comprises a statistical search engine.

85. The method in claim 67 wherein the score for said one document is also a predetermined function of node words in the second logical forms for said one document, a frequency or semantic content of said node words in said one document, frequency or semantic content of predefined node words in said one document, a frequency of specific logical form triples for said one document, or a length of said one document.

86. The method in claim 85 wherein the repository comprises a dataset.

87. The method in claim 85 wherein the query is a full-text query.

88. The method in claim 85 wherein the retrieval system comprises a statistical search engine.

89. The method in claim 85 wherein the system further comprises a client computer, wherein the method comprises the steps, in the client computer, of:

obtaining a query from a user; and displaying, in said rank order, the plurality of documents in the output document set; and the system further comprises a server connected, via a networked connection, to the client computer, wherein the method further comprises the steps in the server of:

obtaining the query from the client computer, and providing said plurality of documents in the output document set in said rank order to the client computer.

90. The method in claim 89 wherein the retrieval system comprises a statistical search engine.

91. The method in claim 90 wherein the networked connection is an Internet or intranet connection.

92. The method in claim 91 further comprising the step, in the search engine and in response to the query, of retrieving a stored record from the repository for each one of said plurality of documents in the output document set, the record containing information specifying where said each one of the documents in the output document set can be found; and, in the server and in response to information contained in the record, of accessing and downloading said each one of the documents from an associated server therefor for inclusion within the output document set.

93. The method in claim 85 wherein the system comprises a client computer and a server connected, via a networked connection to the client computer, said server implementing said retrieval system; wherein the method further comprises the step, in the server, of supplying, in response to the query provided by the client computer, said output document set to the client computer.

94. The method in claim 93 wherein the retrieval system comprises a statistical search engine.

95. The method in claim 94 wherein the networked connection is an Internet or intranet connection.

96. The method in claim 95 further comprising the steps, in the search engine and in response to the query, of retrieving a stored record from the repository for each one of said plurality of documents in the output document set, the record containing information specifying where said each one of the documents in the output document set can be found; and in the client computer and in response to information contained in the record, of accessing and downloading said each one of the documents from an associated server therefor for inclusion within the output document set.

97. The method in claim 85 wherein the system further comprises a computer, wherein the method comprises the step, in the computer, of implementing said retrieval system.

98. The method in claim 97 wherein the retrieval system comprises a statistical search engine.

99. The method in claim 67 wherein each of said first and second logical forms comprise corresponding first and second lists of one or more logical form triples such that said logical form triples, in said first and second lists, are each comprised of a stem form of each of two words, which are semantically related in a corresponding logical form graph, in the query or a phrase in said each one of the documents, respectively, and a predefined relation representing a semantic relationship between the two words.

100. The method in claim 99 wherein either said first or second lists of logical form triples, associated with either the query or with said one of the documents in the output document set, further comprises a paraphrase of the words associated with said query or said one of the documents, respectively.

101. The method in claim 99 wherein the score for said one document is also a predetermined function of node words in the second logical forms for said one document, a frequency or semantic content of said node words in said one document, a frequency or semantic content of predefined node words in said one document, frequency of specific logical form triples for said one document, or a length of said one document.

102. The method in claim 99 wherein the function is a sum of weights taken across the logical form triples, associated with each of said plurality of documents in the output document set, that identically match at least one of the logical form triples associated with the query, wherein a weight assigned to each matching logical form triple is defined by a type of semantic relation associated therewith.

103. The method in claim 102 wherein the ranking step comprises the steps of:

determining whether any of the logical form triples associated with the query matches any of the logical form triples associated with any document in the output document set so as to define a matching triple associated with said any document;

for every one of documents in said output document set that has at least one matching logical form triple associated therewith, weighting matching logical form triples in said every one document using a numeric weight predefined by the semantic relationship associated with said each matching logical form triple so as to form one or more weights for said one document;

calculating a score for said one document as a function of said one or more weights; and ranking every one of said documents in accordance with said score thereof so as to define the rank order.

104. The method in claim 103 wherein the rank order is descending weight order.

105. The method in claim 99 wherein stored entries providing step comprises the step of presenting a first predefined group of said entries for said output document set that has highest successive rankings of the documents in said output document set.

106. The method in claim 105 wherein the plurality of documents in the output document set consists of documents in said output document set that have at least one matching triple associated therewith.

107. The method in claim 106 wherein each of said first and second logical form triples is comprised of a stem form of each of two words, which are semantically related in a corresponding logical form graph, in the query or a phrase in said each one of the documents, respectively, and a predefined relation representing a semantic relationship between the two words.

108. The method in claim 99 wherein said logical form triples, associated with either the query or with said one of the documents in the output document set, further comprise a logical form triple containing a hypernym or synonym of either of said words.

109. The method in claim 99 wherein said match between said any of the logical form triples associated with the query and said any of the logical form triples associated with any document in the output document set is an identical match.

110. The method in claim 99 wherein the repository comprises a dataset.

111. The method in claim 99 wherein the query is a full-text query.

112. The method in claim 99 wherein the retrieval system comprises a statistical search engine.

113. The method in claim 99 wherein the system further comprises a client computer, wherein the method comprises the steps, in the client computer, of:

obtaining a query from a user; and displaying, in said rank order, the plurality of documents in the output document set; and the system further comprises a server connected, via a networked connection, to the client computer, wherein the method further comprises the steps in the server of:

obtaining the query from the client computer, and providing said plurality of documents in the output document set in said rank order to the client computer.

114. The method in claim 113 wherein the retrieval system comprises a statistical search engine.

115. The method in claim 114 wherein the networked connection is an Internet or intranet connection.

116. The method in claim 115 further comprising the step, in the search engine and in response to the query, of retrieving a stored record from the repository for each one of said plurality of documents in the output document set, the record containing information specifying where said each one of the documents in the output document set can be found; and, in the server and in response to information contained in the record, of accessing and downloading said each one of the documents from an associated server therefor for inclusion within the output document set.

117. The method in claim 99 wherein the system comprises a client computer and a server connected, via a networked connection to the client computer, said server implementing said retrieval system; wherein the method further comprises the step, in the server, of supplying, in response to the query provided by the client computer, said output document set to the client computer.

118. The method in claim 117 wherein the retrieval system comprises a statistical search engine.

119. The method in claim 118 wherein the networked connection is an Internet or intranet connection.

120. The method in claim 119 further comprising the steps, in the search engine and in response to the query, of retrieving a stored record from the repository for each one of said plurality of documents in the output document set, the record containing information specifying where said each one of the documents in the output document set can be found; and in the client computer and in response to information contained in the record, of accessing and downloading said each one of the documents from an associated server therefor for inclusion within the output document set.

121. The method in claim 99 wherein the system further comprises a computer, wherein the method comprises the step, in the computer, of implementing said retrieval system.

122. The method in claim 121 wherein the retrieval system comprises a statistical search engine.

123. A computer readable medium having computer executable instructions stored therein for performing the steps of claim 63.

* * * * *